(12) United States Patent
Kobayashi

(10) Patent No.: US 6,628,677 B1
(45) Date of Patent: Sep. 30, 2003

(54) CODING AND MULTIPLEXING APPARATUS AND METHOD

(75) Inventor: Naomasa Kobayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/258,982

(22) Filed: Feb. 26, 1999

(30) Foreign Application Priority Data

| Feb. 28, 1998 | (JP) | ............................................ P10-064539 |
| Feb. 28, 1998 | (JP) | ............................................ P10-064540 |
| Feb. 28, 1998 | (JP) | ............................................ P10-064541 |
| Feb. 28, 1998 | (JP) | ............................................ P10-064542 |

(51) Int. Cl.[7] .............................. H04J 3/04; H04J 3/22
(52) U.S. Cl. ...................... 370/535; 370/537; 370/538
(58) Field of Search ................................ 370/498, 521, 370/535, 537, 538, 540, 543, 349, 347, 395.4, 395.71, 429, 474, 497, 468

(56) References Cited

U.S. PATENT DOCUMENTS

| 5,511,054 A | * | 4/1996 | Oishi et al. ............... 369/59.27 |
| 5,847,770 A | * | 12/1998 | Yagasaki .................... 348/563 |
| 6,124,878 A | * | 9/2000 | Adams et al. ............... 725/118 |
| 6,157,674 A | * | 12/2000 | Oda et al. ................... 375/240 |
| 6,359,882 B1 | * | 3/2002 | Robles et al. ............... 370/389 |
| 6,438,139 B1 | * | 8/2002 | Huang et al. ............... 370/468 |
| 6,504,850 B1 | * | 1/2003 | Kato et al. .................. 370/465 |

* cited by examiner

Primary Examiner—Hassan Kizou
Assistant Examiner—Saba Tsegaye
(74) Attorney, Agent, or Firm—Lerner, David, Littenberg, Krumholz & Mentlik, LLP

(57) ABSTRACT

A multi-channel coding and multiplexer apparatus comprises a number of coders, buffers and a multiplexer. For each channel, a coder receives an input signal and provides coded data to a corresponding buffer. A surplus bandwidth is determined in accordance with the amount of coded data provided by the coders. The multiplexer distributes this surplus bandwidth to one, or more, channels by adjusting the rate at which the coded data is read from the corresponding buffer.

7 Claims, 13 Drawing Sheets

```
for(i=n;i<Nf;i++){
   if(i==n) {
        Tw[i+1]=((Co+C[n])/Ro)-Tf;
     }
     else {
        Tw[i+1]=Tw[i]+(C[i]/Ro)-Tf;
     }
     if(Tw[i+1]<0)Tw[i+1]=0;
}
Cmax=(To-Tw[Nf])×Ro
```

FIG. 8

```
Tw[n+1]=(Co+C[n])/Ro-Tf
if(Tw[n+1]<0) {
    A=(-1)×Tw[n+1]×Ro;
    Tw[n+1]=0;
}
else A=0;
```

FIG. 9

```
for(i=n; i>=Nb; i--) {
    if(i==n) {
        Tw[i]=Co/Ro;
    }
    else {
        Tw[i]=Tw[i+1]-(C[i]/Ro)+Tf;
    }
}
Zmax=min(Tw[Nb],…,Tw[n-1],Tw[n]) ×Ro
```

FIG. 10

CODING AND MULTIPLEXING APPARATUS AND METHOD

BACKGROUND OF THE INVENTION

1. Field of the Invention

The present invention relates to a coding and multiplexing apparatus and method and more particularly, is suitably applied to a transmission system for a digital multichannel broadcasting.

2. Description of the Related Art

Digital multichannel broadcastings using a communication satellite (CS) have been started even in Japan. Moreover, in the near future, a similar service will be provided in broadcasting systems using a broadcasting satellite (BS), and ground waves or cables.

Such digital multichannel broadcasting is performed in such a manner that, in a transmitting side, a video signal of each channel is subjected to a digital compression processing and obtained coded data is transmitted after being multiplexed within a limited band (hereinafter, this is referred to as broadcast bandwidth), for instance, of 30 bps degree.

FIG. 1 shows a structural example of the transmitting side in such the digital multichannel broadcasting system. In such a transmission system 100, a plurality of coding devices 102A to 102N are provided, in which video signals S101A to S101N are supplied to the coding devices 102A to 102N respectively.

Each of the coding devices 102A to 102N performs compression coding on the supplied video signal S101A to S101N, for example, at a peculiar set rate preset based on the moving picture experts group phase 2 (MPEG2), and transmits thus obtained coded data D101A to D101N to a multiplexer 103. Note that, the set rate for each coding device 102A to 102N has been set so that the total of the set rates is within the broadcast bandwidth of the digital multichannel broadcasting.

In the multiplexer 103, a plurality of buffers 104A to 104N provided corresponding to coding devices 102A to 102N respectively and a multiplexing control part 105 for controlling read-write of each buffer 104A to 104N are included. The coded data D101A to D101N supplied from coding devices 102A to 102N respectively are sequentially fed into the corresponding buffers 104A to 104N.

Besides, the multiplexing control part 105 monitors the amount of data in each buffer 104A to 104N via a control bus 106, and evenly reads the coded data D101A to D101N from respective buffers 104A to 104N in time division based on the monitor result.

As a result, these coded data D101A to D101N, respectively read from respective buffers 104A to 104N, are supplied to a transmitting part 108 via a data bus 107 as transmission data D102. In the transmitting part 108, the transmission data D102 is subjected to a predetermined signal processing, such as quadrature phase shift keying (QPSK) modulation, and then transmitted to a receiving side sequentially via an antenna 109, a communication satellite not shown in the figure, and the like, as a transmission signal S102.

The fixed rate method of coding each of the video signals S101A to S101N for a plurality of channels at a rate preset for each channel has an advantage that the coded data D101A to D101N corresponding to the video signals S101A to S101N can be multiplexed in time division within the broadcast bandwidth without requiring complicated control.

However, the fixed rate method as described above has a problem in that pictures are greatly inferior in quality in complicated pictures or in changing scenes because the video signal A101A to A101N of each channel is always digital-compressed at a fixed rate.

In addition, the fixed rate method has a problem in that transmission efficiency deteriorates because dummy data has to be added to a picture which needs only a few amount of code in order to keep the output rate constant.

To solve the problems, a statistics multiplexing method has been proposed as another method of coding and multiplexing video signals S101A to S101N for a plurality of channels.

FIG. 2 in which the same reference numerals are applied to parts corresponding to FIG. 1 shows a structural example of a transmission system 200 for performing coding and multiplexing in accordance with the statistics multiplexing method. A plurality of coding devices 202A to 202N are provided so as to be given video signals S101A to S101N respectively.

In this case, each of the coding devices 202A to 202N is composed of a coding-difficulty detecting parts 212A to 212N and a coding part 213A to 213N, so as to input the supplied video signal S101A to S101N to the coding-difficulty detecting part 212A to 212N. Then, the coding-difficulty detecting part 212A to 212N detects difficulty of coding the supplied video signal S101A to S101N, and transmits the obtained difficulty information D210A to D210N to a multiplexer 203 and the video signal S101A to S101N to the coding part 213A to 213N of the next stage.

The multiplexer 203 includes a plurality of buffers 204A to 204N respectively corresponding to the coding devices 202A to 202N, a multiplexing control part 205 for controlling write-read of each buffer 204A to 204N, and a coding control part 215 for controlling the coding parts 213A to 213N of the coding devices 202A to 202N. The difficulty information D210A to 210N supplied from the coding-difficulty detecting parts 212A to 212N of the coding devices 202A to 202N are input to the coding control part 215.

The coding control part 215 decides coding rates for the coding devices 202A to 202N based on the respective difficulty information D210A to D210N so that a video signal S101A to S101N having larger difficulty can use a wider bandwidth and the total of coding rates is within the broadcast bandwidth for the digital multichannel broadcasting. Then, the coding control part 215 transmits control signals S210A to S210N based on the derision result to the coding parts 213A to 213N of the coding devices 202A to 202N respectively.

Thus, the coding parts 213A to 213N of the coding device 202A to 202N code the respectively-supplied video signals S101A to S101N at respective coding rates, which are obtained based on the. control signals S210A to S210N supplied from the coding control part 215 of the multiplexer 203. Each of the obtained coded data D201A to D201N is transmitted to the multiplexer 203.

As a result, the coded data D201A to D201N, which are output from the coding devices 202A to 202N respectively, are fetched to the corresponding buffers 204A to 204N of the multiplexer 203, are evenly read out in time division under the control of multiplexing control part 205, and then, are transmitted to a transmitting part 108 through a data bus 207 as transmission data D202. The transmission data D202 is subjected to a predetermined signal process in the transmitting part 108, and then is transmitted to the receiving side sequentially via the antenna 109, a communication satellite not shown in figure, and the like, as a transmission signal S202.

Such the statistics multiplexing method has an advantage in that, as compared with the fixed rate method, transmission efficiency is good and a picture having high difficulty can be transmitted remaining comparatively high quality on the average of picture quality among channels, because dummy data does not have to be added and the coding rate is decided based on the difficulty of a picture for each channel as described above.

However, the statistics multiplexing method has a problem in that simultaneous control of channels is complicated and it is difficult to make the best use of the merit of dynamically controlling bandwidth, in such a case that the same video signal is hierarchical-coded to be broadcasted on plural channels, because the amount of coded data changes depending on a picture.

Further, in the digital multichannel broadcasting, also materials, such as a movie, in which the contents have been already fixed are coded and broadcasted in real time at present. In this case, as one of the methods of coding and broadcasting such a material of which the contents have been already fixed, a method in which the material is coded and stored in advance to be broadcasted at a broadcast time can be considered. Such method has an advantage that more optimized coded data can be obtained comparing with the real-time coding processing because the material can be coded through a multipath.

To sufficiently make the best use of such merit, however, there are limitations in the fixed rate method. That is, in the fixed rate method, dummy data is added to a picture with less amount of code to fix each channel rate.

Therefore, the fixed rate method has a problem in that it is difficult to multiplex a plurality of coded data at a variable rate in which the amount of code has already fixed and the coded data obtained by the real-time coding within the limited broadcast bandwidth with high transmission efficiency.

Further, it is considered in the digital multichannel broadcasting that in a broadcasting station such as a local station and a cable television, programs transmitted from other stations are broadcasted on some channels and original programs are broadcasted on remaining channels.

Therefore, the broadcasting station such as a local station and a cable television needs a transmission system capable of multiplexing and broadcasting data of programs transmitted from other stations and data of original programs within the limited bandwidth.

FIG. 3 shows an structural example of such transmission system, in which a plurality of rate converters 302A to 302N and a plurality of coding device 312A to 312N are provided at a input stage. The rate converters 302A to 302N are given, for example, coded data D301A to D301N of programs transmitted from other stations respectively, and the coding devices 312A to 312N are given video signals S311A to S311N of original programs.

Each rate converter 302A to 302N converts a rate to a predetermined rate previously set for the channel (hereinafter, referred to as a set rate) with a method of decoding the supplied coded data D301A to 301N and coding it again or with a method of eliminating high hierarchical coefficients without decoding, in order to transmit obtained coded data D311A to D311N to a multiplexer 303.

Further, each coding device 312A to 312N compression-codes the supplied video signal S311A to S311N at the set rate for the channel, and transmits obtained coded data D321A to D321N to the multiplexer 303. Note that, the set rates of the channels are set in advance so that the total of them is within a bandwidth which can be used for the broadcasting station.

The multiplexer 303 is composed of a plurality of buffers 304A to 304N and 314A to 314N respectively corresponding to the rate converters 302A to 302N and the coding devices 312A to 312N, and a multiplexing control part 305 for controlling read-write of each buffer 304A to 304N, 314A to 314N.

In this case, the multiplexing control part 305 makes the buffers 304A to 304N and 314A to 314N take in the coded data D311A to D311N and D321A to D321N respectively, which are supplied from the rate converters 302A to 302N and the coding device 312A to 312N respectively, and moreover, sequentially reads each of the coded data from the buffer 304A to 304N and 314A to 314N in time division at a set rate of each channel.

As a result, the coded data D311A to D311N and D321A to D321N, which are read out from the respective buffers 304A to 304N and 314A to 314N, are supplied to a transmitting part 308 as transmission data D302. The transmission data D302 is subjected to a predetermined signal processing and is transmitted to a receiving side as a transmission signal S302.

In this way, the transmission system 300 can perform a digital multichannel broadcasting by multiplexing the coded data D301A to D301N supplied from other stations and coded data D321A to D321N obtained by coding the video signals S311A to S311N of original programs.

However, such the transmission system 300 has a problem in that a picture is greatly inferior in quality in a complicated picture or in changing scenes when the coding devices 312A to 312N compression-codes the video signals S311A to S311N, because a rate is fixedly assigned to each channel.

Further, the transmission system 300 has a problem in that transmission efficiency deteriorates because dummy data have to be added even to a picture which needs only a few amount of code at the time of compression-coding the video signals S311A to S311N in the coding devices 312A to 312N, since the rate is fixedly assigned to each channel to keep the output rate constant.

FIG. 4 shows an structural example of another digital multichannel broadcasting system. In a transmission system 400, a plurality of hierarchical coding devices 402A to 402N are provided so as to be given video signal S401A to S401N in the high definition television (HDTV) system respectively.

An information hierarchical part 410 of each hierarchical coding device 402A to 402N sequentially performs a filtering and a subsampling on the supplied video signal S401A to 401N to hierarchically generate a plurality of pictures having different resolutions. The plurality of pictures are taken as layer video signals S411A to 411M in the order of lower frequency component (that is, in the order of pictures having rougher resolution), and are supplied to corresponding layer coding parts 412A to 412M.

The layer coding parts 412A to 412M mutually obtain differences between layer video signals S411A to S411M through a data path 415 Thereby, the layer video signal S411A having the lowest frequency component, which is obtained by down-subsampling the video signal S401A, is supplied to the layer coding part 412A. And only the remaining component obtained by eliminating the frequency component of the layer video signal S411A from the layer video signal S411B is supplied to the layer coding part 412B. In the same way, as a layer becomes higher rank, only remaining frequency component being difference between the layer and the following low rank layer (that is, a part remaining after eliminating a correlation picture) is supplied to the layer coding part 412C to 412M, one after another.

Thus, each layer coding part 412A to 412M compression-codes the remaining component, which remains after eliminating a correlation component for each layer, of the supplied video signal S411A to S411M at a proper set rate previously set based on, for example, the moving picture experts group phase 2 (MPEG2), and transmits thus obtained layer coded data D411A to D411M to the corresponding layer buffer 414A to 414M. Note that, the set rates for the layer coding parts 412A to 412M in the each coding device 402A to 402M are set so that the total of the set rates is within a broadcast bandwidth in the digital multichannel broadcasting.

Each layer buffer 414A to 414M takes in the supplied layer coded data D411A to D411M under the control of hierarchical coding and multiplexing control part 418.

The hierarchical coding and multiplexing control part 418 monitors the amount of data in each layer buffer 414A to 414M through a control bus 416 to evenly read the layer coded data D411A to D411M from layer buffers 414A to 414M based on the monitor result in time division.

As a result, the layer coded data D411A to D411, which are read from the layer buffers 414A to 414M respectively, are given to a multiplexer 403 as coded data D401A through a data bus 417.

In the multiplexer 403, a plurality of multiplexing buffers 404A to 404N respectively corresponding to the hierarchical coding device 402A to 402N and a multiplexing control part 405 for controlling read-write of each multiplexing buffer 404A to 404N are provided. The coded data D401A to D401N supplied from the hierarchical coding device 402A to 402N respectively are taken in to the corresponding multiplexing buffers 404A to 404N.

The multiplexing control part 405 monitors the amount of data in each multiplexing buffer 404A to 404N through a control bus 406 to evenly read the coded data D401A to D401N from the multiplexing buffers 404A to 404N based on the monitored result in time division. As a result, the coded data D401A to D401N, which are read out from the multiplexing buffers 404A to 404N respectively, are given to a transmitting part 108 through a data bus 407 as transmission data D402. The transmission data D402 is subjected to a predetermined signal processing such the quadrature phase shift keying (QPSK) modulation in the transmitting part 108, and then is transmitted to a receiving side successively via an antenna 109, a communication satellite not shown, and the like, as a transmission signal S402.

The fixed rate method of coding the video signals S401A to 401N for a plurality of channels at a rate set in advance for each channel has a advantage in that the coded data D401A to 401N obtained by hierarchically layering the video signal S401A to S401N can be multiplexed in time division within a broadcast bandwidth without complicated control.

However, the fixed rate method as described above has a problem in that a picture is greatly inferior in quality in a complicated picture or in changing scenes because the video signal S401A to S401N for each channel is always subjected to the digital compression processing at a fixed rate. In addition, the fixed rate method has a problem in that transmission efficiency deteriorates because dummy data have to be added to a picture which needs only a few amount of code to keep an output rate constant.

To solve the problems, the statistics multiplexing method has been proposed as another method of coding and multiplexing the video signals S401A to S401N for a plurality of channels. This statistics multiplexing method is the method of detecting difficulty for the time of coding each video signal, and set a. coding rate for each coding device so that a wide band is assigned to a video signal having high difficulty and the total of coding rates is within a broadcast bandwidth for the digital multichannel broadcasting.

Such the statistics multiplexing method has an advantage in that, as compared with the fixed rate method, transmission efficiency is good and a picture having high difficulty can be transmitted remaining comparatively high quality on the average of picture quality of channels, because dummy data does not have to be added and the coding rate is decided based on difficulty of a picture for each channel as described above.

However, the statistics multiplexing method has a problem in that simultaneous control of channels is complicated and it is difficult to make the best use of the merit of dynamically controlling bandwidths, as in the case of the transmission system 400 shown in FIG. 4 in which that the same video signals S401A to S401N is hierarchical-coded to be broadcasted on plural channels, because the amount of coded data changes depending on a picture.

SUMMARY OF THE INVENTION

In view of the foregoing, an object of this invention is to provide a coding and multiplexing apparatus and a coding and multiplexing method capable of remarkably improving transmission efficiency.

The foregoing object and other objects of the invention have been achieved by the provision of a coding and multiplexing apparatus which comprises buffers for storing coded data output from corresponding coding means and multiplexing means for reading out and multiplexing each of coded data, which are stored in the buffers, in time division at a proper rate set in advance for corresponding coding means. The multiplexing means distributes a surplus bandwidth for a set rate of coding means among the read of the coded data from buffers corresponding other coding means.

As a result, in the coding and multiplexing apparatus, bandwidth control for each channel can be dynamically performed, and also a temporal change in difficulty in coding can be absorbed through channels.

Further, this invention provides the coding and multiplexing method comprising the first step of compression-coding video signals and storing the obtained coded data into different buffers, and the second step of reading out each of the coded data, which are stored into the different buffers, in time division at a proper timing preset for each channel. The second step distributes a surplus band for a set rate of a channel among the read of coded data from the buffers of other channels.

As a result, according to the coding and multiplexing method, a bandwidth for each channel can be dynamically controlled and temporal change in difficulty in coding can be absorbed through the channels.

Further, this invention provides the coding and multiplexing apparatus which comprises a plurality of the first buffers for respectively storing the first coded data read out from a storage means, a plurality of the second buffers for respectively storing the second coded data which are obtained by compression-coding video signals outputted from the corresponding coding means, and multiplexing means for reading out each of the first and second coded data, which are respectively stored in the first and the second buffers, in time division at a proper rate preset for the corresponding storage means or coding means and multiplexing the first and the second coded data. And the multiplexing means distributes a surplus bandwidth for the set rate of the storage means and the coding means among the read of the second coded data from the second buffers corresponding to the other coding means.

As a result, in this coding and multiplexing apparatus, the bandwidth for each channel can be dynamically controlled, and also a temporal change in difficulty in coding can be absorbed through channels.

Moreover, this invention provides the coding and multiplexing method which comprises the first step of reading the first coded data for one or a plurality of channels that has been previously stored after compression-coded and storing them in the different first buffers as well as performing the compression coding on inputted video signals for one or a plurality of channels and storing the second coded data obtained in different second buffers, and the second step of reading each of the first and the second coded data, which are respectively stored in the first and second buffers, in time division at a proper rate preset for each channel and multiplexing the first and the second coded data. In the second step, a surplus bandwidth for the set rate of each channel is distributed among the read of the second coded data of other channels from the second buffers.

As a result, according to the coding and multiplexing method, a bandwidth for each channel can be dynamically controlled, and also a temporal change in difficulty in coding can be absorbed through channels.

Further, this invention provides the coding and multiplexing apparatus which comprises first buffers for storing first coded data which is subjected to a rate conversion and is outputted from the corresponding rate conversion means, second buffers for storing second coded data obtained by compression-coding video signals outputted from respective coding means, and multiplexing means for reading each of the first and second coded data, which are stored in respective first and second buffers, at a proper set rate preset for corresponding rate conversion means and coding means. And the multiplexing means distributes a surplus bandwidth for the set rate of the rate conversion means and the coding means among the read of the first or second coded data from the first or second buffers corresponding to other rate conversion means or coding means.

As a result, in the coding and multiplexing apparatus, a bandwidth for each channel can be dynamically controlled, and also a temporal change of the amount of code in rate conversion or in coding can be absorbed through channels.

Further, this invention provides the coding and multiplexing method which comprises the first step of converting rates of inputted coded data for one or a plurality of channels and storing them in different first buffers as well as compression-coding video signals for one or a plurality of channels and storing them in different second buffers, and the second step of read each of the first coded data and second coded data, which are stored in the first and second buffers respectively, in time division at a proper set rate preset for each channel. And the second step distributes a surplus bandwidth for a reading rate of each channel among the read of the fist and/or second coded data from the first and/or second buffers corresponding to other channels.

As a result, in the coding and multiplexing method, a band for each channel can be dynamically controlled, and also a temporal change of the amount of code in rate conversion or in coding can be absorbed through channels.

Further, this invention provides the coding and multiplexing apparatus which has hierarchical means for converting an inputted video signal into a plurality of layer video signals which hierarchically have different resolutions and which compression-codes each of layer video signals, which are outputted from the hierarchical means with different coding means, and multiplexes the obtained coded data. The coding and multiplexing apparatus comprises buffers provided corresponding to the coding means for storing coded data outputted from corresponding coding means, and multiplexing means for reading each of coded data, which are stored in the buffers, in time division at a proper set rate preset for corresponding coding means and multiplexing the coded data. The multiplexing means distributes a surplus bandwidth for the set rate of the coding means among the read of coded data from the buffers corresponding to other coding means.

As a result, in the coding and multiplexing apparatus, a bandwidth for each layer can be dynamically controlled, and also a temporal change of the amount of code in coding can be absorbed through channels.

Furthermore, this invention provides the coding and multiplexing method for converting an inputted video signal into a plural layer video signals hierarchically having different resolutions, compression-coding each layer video signal, and multiplexing obtained coded data. The coding and multiplexing method comprises the first step of storing coded data of layers in respective buffers, and the second step of reading each of the coded data, which are stored in respective buffers, in time division at a proper set rate preset for each layer and multiplexing coded data. The second step distributes a surplus bandwidth for the set rate of the layer among the read of coded data from the buffers corresponding to other layers.

As a result, in the coding and multiplexing method, a bandwidth for each layer can be dynamically controlled, and also a temporal change of the amount of code in coding can be absorbed through layers.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 8 is a schematic diagram showing an amount-of-code limit value arithmetic program;.

FIG. 9 is a schematic diagram showing an amount-of-surplus-transmission-code arithmetic program;

FIG. 10 is a schematic diagram showing a congestion limit value arithmetic program;

DETAILED DESCRIPTION OF THE EMBODIMENT

Preferred embodiments of this invention will be described with reference to the accompanying drawings:

(1) Principle

Figure 5:
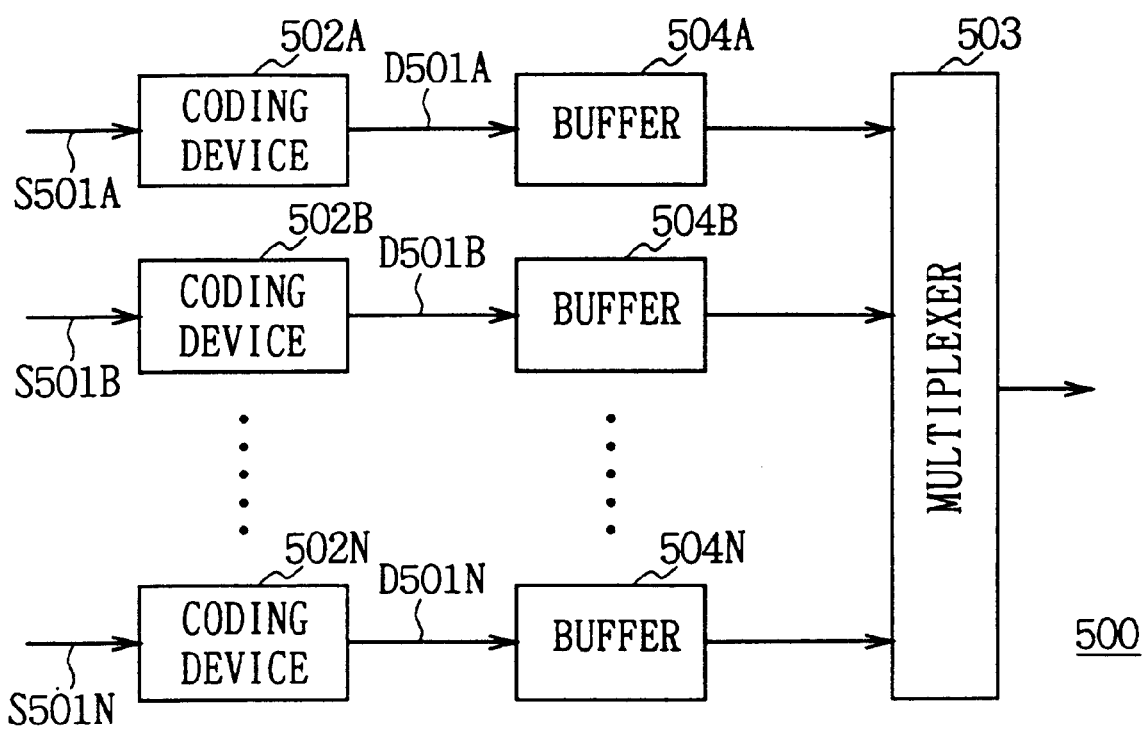
FIG. 5 is a block diagram showing the configuration of a coding and multiplexing apparatus for the theoretical explanation of this invention.

As shown in FIG. 5, a case will be considered that, in a coding and multiplexing apparatus 500 in which video signals S501A to S501N for a plurality of channels are subjected to a compression coding in coding devices 502A to 502N respectively and the obtained coded data D501A to D501N are multiplexed within a specified transmission band by a multiplexer 503, virtual buffers 504A to 504N are provided between the respective coding devices 502A to 502N and the multiplexer 503.

In this case, it is assumed that writing the coded data D501A to D501N from the coding devices 502A to 502N to the buffers 504A to 504N, respectively, is immediately performed in an access unit with one picture as the access unit, and its write cycle is a picture cycle of the video signal S501A to S501N to be inputted to each coding device 502A to 502N. Furthermore, in each coding device 502A to 502N, a proper coding rate has been preset so that the total does not exceed the broadcast bandwidth of this digital multichannel broadcasting.

Here, in the case where it is the time when one of the coding devices 502A to 502N writes an arbitrary picture (n) based on the video signal S501A to S501N to the corresponding buffer 504A to 504N, if it is assumed that an amount of data occupying the buffer 504A to 504N immediately before writing the above picture (n) is $C_0$ [bit], the amount of code of the picture (n) is $C[n]$ [bit], the time from when the picture (n) is started to be written in the corresponding buffer 504A to 504N until when its head is read out (hereinafter, this is referred to as waiting time) is $Tw[n]$ [s], a set rate for the coding device 502A to 502N is $R_0$ [bps], and a picture cycle is $Tf$ [s], the waiting time $Tw[n+1]$ for the succeeding picture (n+1) is obtained by the following expression (1).

$$Tw[n+1] = \frac{C_0 + C[n]}{R_0} - Tf \tag{1}$$

Then, if this waiting time $Tw[n+1]$ satisfies the following expression (2), $$Tw[n+1]<0 \tag{2}$$

the coded data D501A to D501N for the amount of code A which is obtained with the following expression (3) can be excessively transmitted within a set rate $R_0$ for the coding device 502A to 502N.

$$A=(-1) \times Tw[n+1] \times R_0 \tag{3}$$

Therefore, in this case, by setting the rate for read the coded data D501A to D501N from the buffers 504A to 504N corresponding to the coding devices 502A to 502N during the time from the start time of writing the picture (n) to the start time of writing the succeeding picture (n+1) (the time corresponding to one picture cycle) as the following expression (4):

$$R_0 - \frac{A}{Tf} \tag{4}$$

among the set rates $R_0$ assigned to the coding devices 502A to 502N, the bandwidth obtained by the following expression (5)

$$\frac{A}{Tf} \tag{5}$$

can be distributed among the other coding devices 502A to 502N as a surplus bandwidth (hereinafter, this is referred to as bandgap).

However, in this case, if the coded data D501A to D501N are successively read out from the buffers 504A to 504N corresponding to the other coding devices 502A to 502N at a high rate by such distributing operation of bandgap, overflow may occur in a buffer at the receiving side. To avoid such overflow, the amount of code to be distributed to the bandgap of the other coding devices 502A to 502N have to be limited (hereinafter, this is referred to as congestion limit).

Figure 6A:
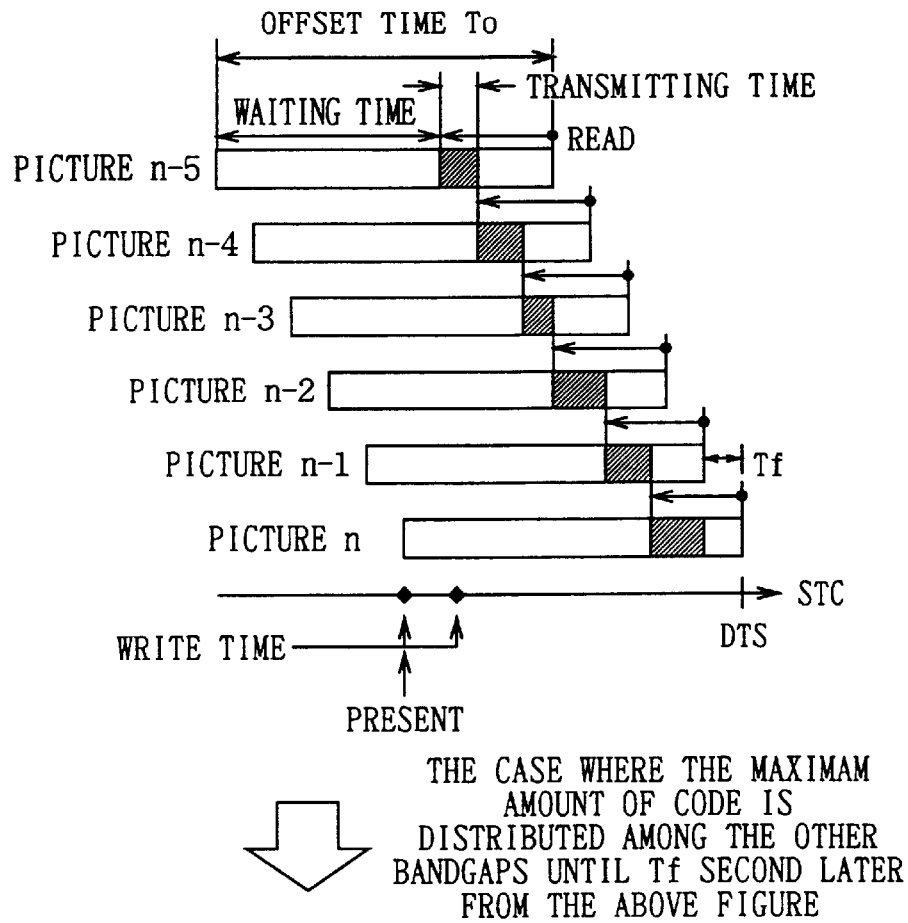
FIGS. 6A and 6B are schematic diagrams explaining congestion control.

In this case, it is assumed that at the time when a certain picture (n) is written to the buffers 504A to 504N, the relationship between each waiting time $Tw[i]$ (i=n−5 to n) from the time when the coded data D501A to D501N of the picture (n) and a plurality of successively preceding pictures n−5 to n−1 are written in the corresponding buffers 504A to 504N respectively until the time when they are decoded and the transmission time are in the state of FIG. 6A.

Figure 6B:
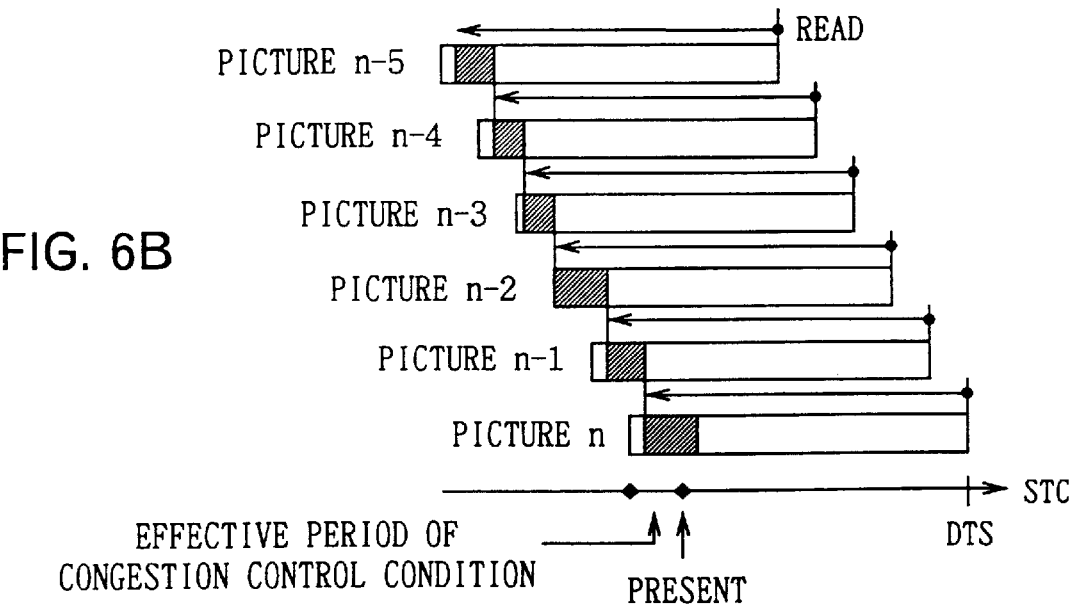

In this state, as shown in FIG. 6B, by estimating all the waiting times of the pictures (n−5) to (n), which are not decoded yet, going back to the past, the maximum value of the amount of code that can be distributed among the other bandgaps until the write time of the succeeding picture (n+1) can be obtained as a value when the minimum value of the waiting time becomes 0.

Practically, it is assumed that the number of the oldest picture that is not decoded yet is Nb, to obtain the waiting time $Tw[n]$ of the picture (n) by the following expression (6).

$$Tw[n] = \frac{C_0}{R_0} \tag{6}$$

Then, by obtaining the waiting time $Tw[i]$ of each picture (i) (i=Nb to n−1), which is not decoded yet and is previous to the picture (n), up to the picture number Nb, with the following expression (7):

$$Tw[i] = Tw[i+1] - \frac{C[i]}{R_0} + Tf \tag{7}$$

the maximum value $Z_{max}$ [bit] of the amount of code can be obtained as the following expression (8):

$$Z_{max}=min\{Tw[Nb], \ldots Tw[n-1], Tw[n]\} \times R_0 \tag{8}$$

On the other hand, at the same time, to avoid the underflow of the buffer at the receiving side, the amount of code per a picture for each coding device 502A to 502N have to be limited.

Practically, when a certain coding device 502A to 502N is practically at the write time of the picture (n), assuming that an amount of data occupying a code buffer immediately before writing the coded data D10A to D10N of the picture (n) is $C_0$ [bit], the amount of code of the picture (n) is C[n] [bit], the waiting time of the picture (n) is Tw[n] [s], a set rate for the coding device 502A to 502N is $R_0$ [bit], a picture cycle is Tf [s], and an offset time is $T_0$ [s], the waiting time Tw[n+1] of the picture (n+1) is obtained by the following expression (9).

$$Tw[n+1] = \frac{C_0 + C[n]}{R_0} - Tf \qquad (9)$$

The waiting time Tw[i] of a picture (i) (i≧n+2) after the picture n+1 is obtained by the following expression (10).

$$Tw[i+1] = Tw[i] + \frac{C[i]}{R_0} - Tf \qquad (10)$$

Thereby, the limit value $C_{max}$ [bit] of the amount of code of a picture Nf several frames after the picture (n) can be obtained as the following expression (11).

$$C_{max} = (T_0 - T_w[N_f]) \times R_0 \qquad (11)$$

Figure 1:
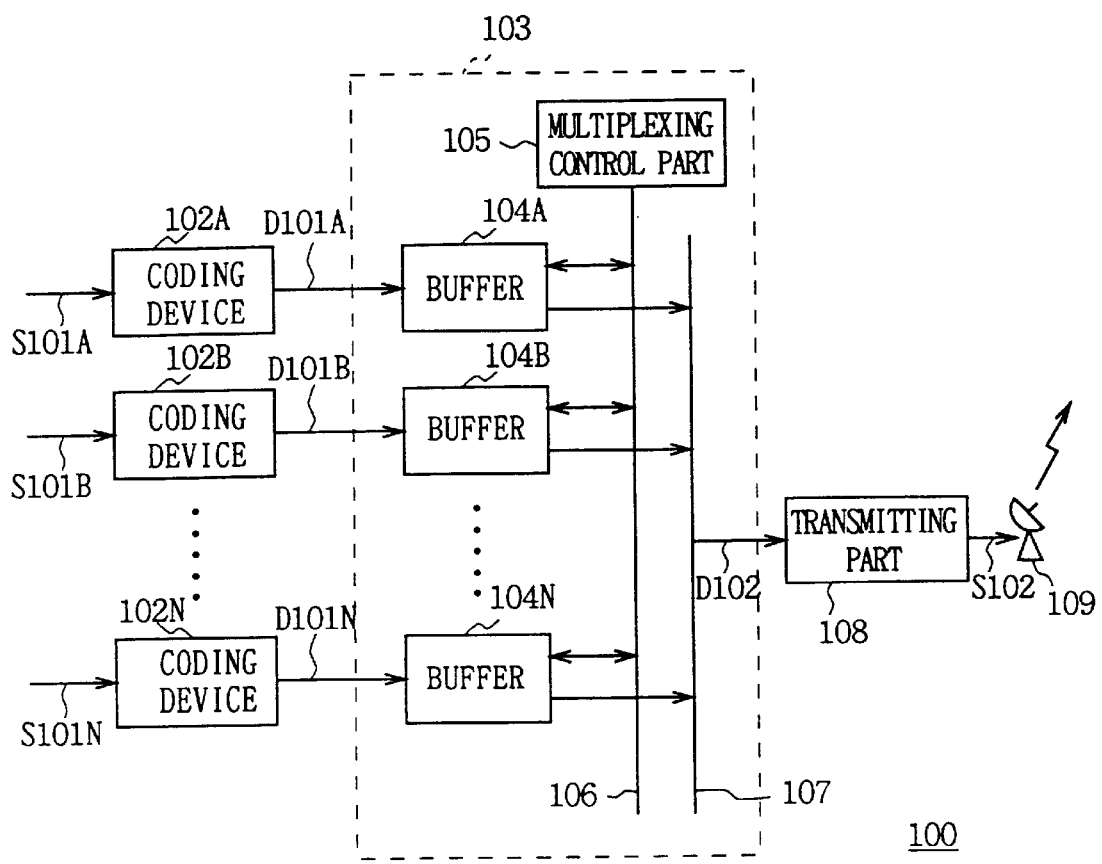
FIG. 1 is a block diagram showing the configuration of a transmission system in a conventional fixed rate method.
Figure 2:
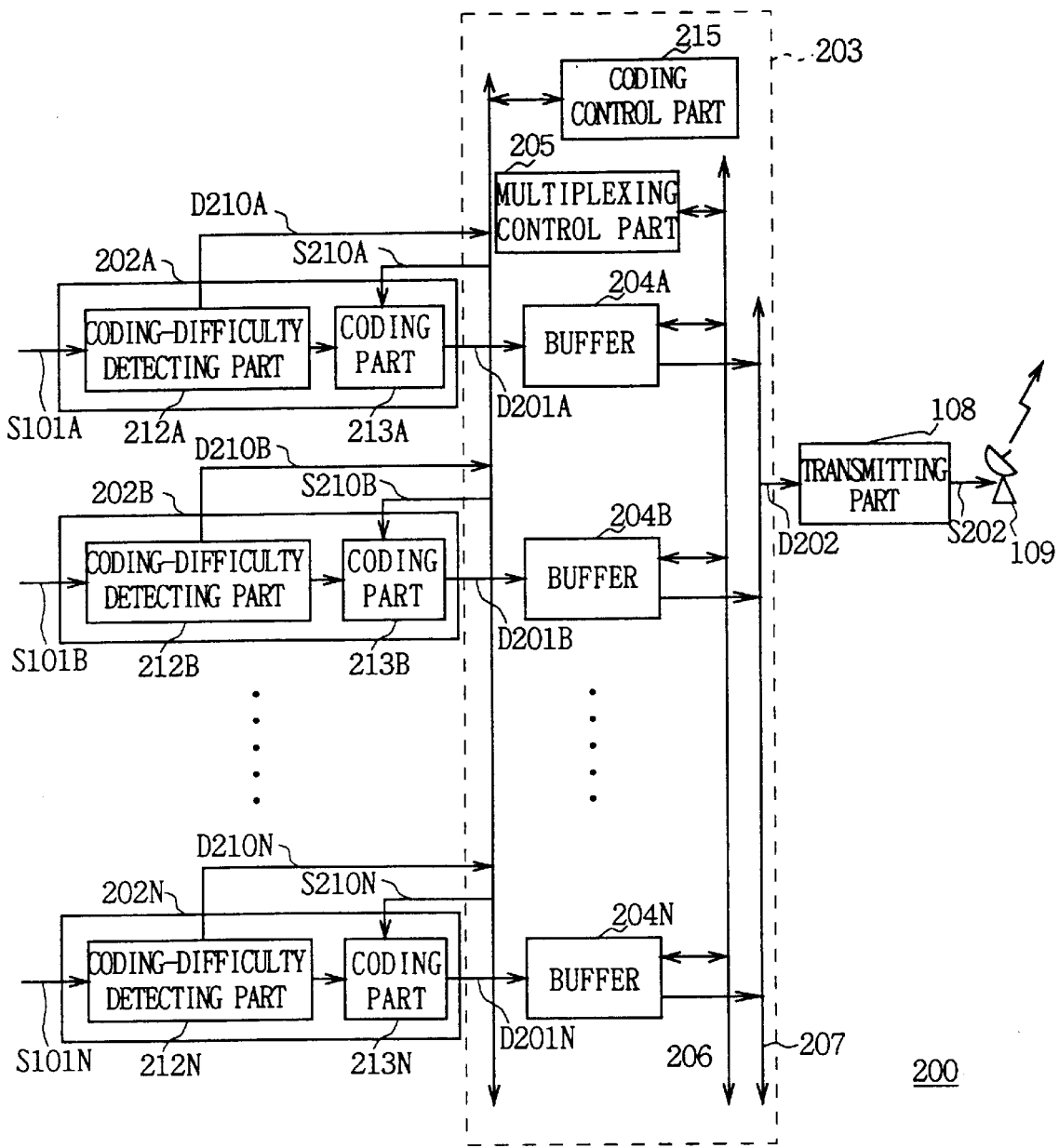
FIG. 2 is a block diagram showing the configuration of a transmission system in a conventional statistics multiplexing method.
Figure 7:
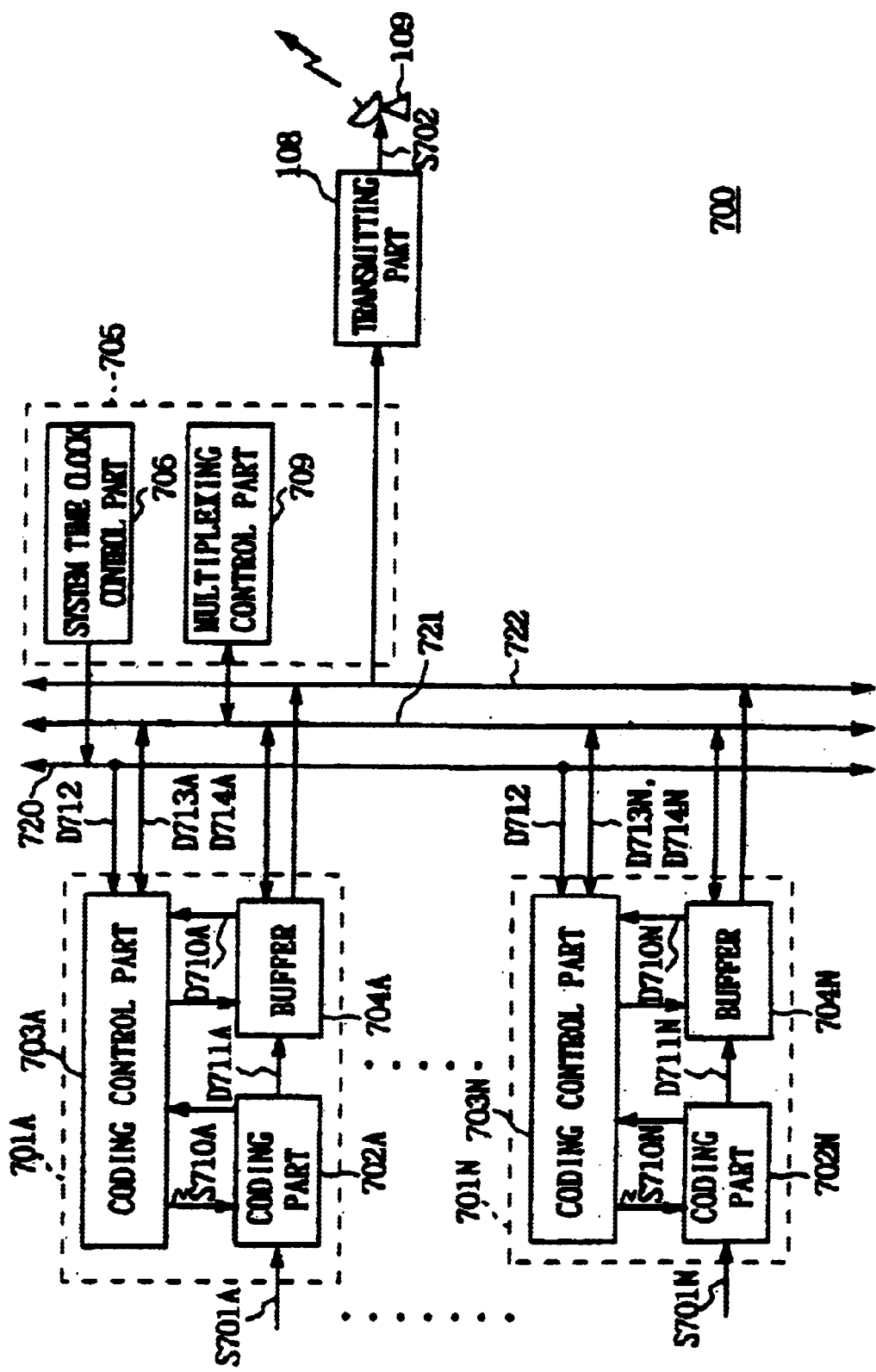
FIG. 7 is a block diagram showing the configuration of a transmission system based on this embodiment.

(2) First Embodiment: Application to Coding Device (2-1) Configuration of Transmission System According to First Embodiment FIG. 7 in which the same reference numerals are applied to parts corresponding to FIG. 1 shows a configuration of a transmission system 700 applied to a digital multichannel broadcasting according to this embodiment. A plurality of coding devices 701A to 701N are provided at an input stage so as to receive video signals S701A to S701N respectively.

Each coding device 701A to 701N is composed of a coding part 702A to 702N, a coding control part 703A to 703N, and a buffer 704A to 704N, in which the supplied video signal S701A to 701N is input to the coding part 702A to 702N.

In this time, the coding control part 703A to 703N performs an amount-of-code limit value arithmetic program shown in FIG. 8 based on occupying data amount information D710A to D710N supplied from the buffer 704A to 704N, an amount of code in a picture unit before the picture (n), the set rate of the channel, and the like, in order to calculate the limit value $C_{max}$ of the amount of code per a picture and supply it to the coding part 702A to 702N as a control signal S710A to S710N.

Thus, the coding part 702A to 702N compression-codes the input video signal S701A to 701N with an amount of code which does not exceeds-the limit value $C_{max}$ obtained based on the control signal S710A to S710N, and stores the obtained coded data D711A to D711N for one picture at the same time in the buffer 704A to 704N in a picture cycle under the control of coding control part 703A to 703N.

In this time, assuming that the time of writing the coded data D711A to D711N for the picture (n) in the buffers 704A to 704N is tp[n], the size of buffer at the receiving side is B, and the set rate for the coding device 701A to 701N is $R_0$, the coding control part 703A, based on system time clock (STC) information D712 having 24 hour cycle which is supplied from a system time clock control part 706 of a multiplexer 705, executes the following expression (12), in order to obtain the time when the picture (n) have to be decoded.

$$DST[n] = (tp[n] + T_0) \qquad (12)$$

however, $$T_0 = \frac{B}{R_0}$$

While decoding time stamp (DTS) [n] representing the time is replaced with DTS which has been added to the coded data D711A to D711N for the picture (n), the program clock reference (PCR) added to the coded data D711A to 711N is replaced with the time obtained based on the then system time clock information D712. Then, they are stored in the buffer 704A to 704N together with the coded data D711A to 711N.

In addition, at this time, the coding control part 703A to 703N executes an amount-of-surplus-transmission-coding arithmetic program shown in FIG. 9 based on an occupying data amount of the buffers 704A to 704N just before writing the coded data D711A to D711N for the picture (n), the set rate of the channel, and an amount of code of the picture (n), in order to obtain an amount of code A capable of being transmitted in surplus. The amount of code A is transmitted to a multiplexing control part 709 of the multiplexer 705 through the second control bus 721 as amount-of-surplus-transmission-coding information D713A to D713N.

Further, the coding control part 703A to 703N also transmits information required for obtaining the maximum of congestion limit $Z_{max}$ (occupying data amount of the buffers 704A to 704N just before writing the picture (n), an amount of code of the picture (n), a set rate of the channel, a picture cycle, and the number of the oldest picture which is not decoded yet, and the like) to the multiplexing control part 709 of the multiplexer 705 through the second control bus 721 as congestion limit value arithmetic information D714A to D714N.

The multiplexing control part 709 checks based on the amount-of-surplus-transmission-coding information D713A to D713N, which are supplied from the coding control part 703A to 703N of the coding devices 701A to 701N respectively, how much the bandgap occurs in which channel and moreover, as to the coding devices 701A to 701N which do not have bandgaps, obtains the limit $C_{max}$ of amount of code to be distributed among the bandgaps of other coding devices 701A to 701N based on the congestion limit value arithmetic information D714A to D714N, which are supplied from the coding control parts 703A to 703N of the coding devices 701A to 701N respectively, in accordance with the a congestion limit value arithmetic program shown in FIG. 10.

The multiplexing control part 709, based on the arithmetic result, sets amount of code A1 to Am to be distributed from channels, in which the bandgap does not occur, among other channels, and amount of code Z1 to Zm to be distributed from other channels among channels in which the bandgap occurs so as to satisfy the following expression (13).

$$A1 + \ldots + Am \geq Z1 + \ldots + Zm \qquad (13)$$

Then, until the time of writing the following picture (n+1), the multiplexing control part 709 reads the coded data D711A to D711N from the buffers 704A to 704N of the coding devices 701A to 701N in time division: as to channels in which the bandgap does not occur, at a rate of the following expression (14) assuming that the set rate of the channel is R0, the picture cycle is Tf, the amount of-code to be distributed is A1 to Am;

$$R_0 + \frac{Zi}{Tf}(i = 1, 2, \ldots m) \quad (14)$$

as to the channel in which the bandgap occurs, at a rate of the following expression (15) assuming that the set rate of the channel is R0, the picture cycle is Tf, the amount of code to be distributed is Z1 to Zm.

$$R_0 - \frac{Ai}{Tf}(i = 1, 2, \ldots m) \quad (15)$$

Then, the coded data D711A to D711N, which are read out in time division, are transmitted through the data bus 722 to a transmitting part 108 to be subjected to a predetermined signal processing, and transmitted to a receiving side successively through the antenna 109 and a communication satellite not shown as a transmission signal S702.

In this way, in the transmission system 700, the video signals for a plurality of channels are coded and multiplexed to be transmitted to a receiving side.

(2-2) Operation and Effect of First Embodiment

In the transmission system 700 according to the aforementioned configuration, each coding device 701A to 701N codes the input video signal S701A to S701N and obtains an amount of code A capable of being transmitted in surplus. Further, based on the obtained result, each coding device 701A to 701N lowers the rate (that corresponds to a set rate of the channel) of reading the coded data from the buffer 704A to 704N of the coding device 701A to 701N of the channel in which the bandgap occurs, and distributes the lowered amount among the read of coded data from the buffers 704A to 704N of the coding devices 701A to 701N of other channels in which the bandgap does not occurs.

Therefore, in the transmission system 700, even in the case where the bandgap occurs in any of channels, the bandgap can be effectively utilized without adding dummy data, as the conventional fixed rate method.

Further, the transmission system 700 can surely decode the pictures at a designated decoding time with preventing the buffers at the receiving side from overflow and underflow, only each coding device 701A to 701N keeps the limit of the amount of code per a picture. Thus, the simultaneous control can be performed between channels.

According to the aforementioned configuration, while the multiplexer 705 distributes a preset bandwidth among the coding devices 701A to 701N, the coding devices dynamically detect a bandgap not required to distribute it among the coding devices 701A to 701N which need the band. Therefore, a bandwidth of each channel can be dynamically controlled and thus, the transmission system capable of remarkably improving transmission efficiency can be realized.

(2-3) Other Embodiment

Note that, in the first embodiment, the present invention is applied to the transmission system for a digital multichannel broadcasting. However, the present invention is not limited thereto and can be widely applied to a coding and multiplexing apparatus used for other various systems.

Further, in the first embodiment, each of the coding control parts 703A to 703N of the respective coding devices 701A to 701N calculates the limit value $C_{max}$ for the amount of code to be generated per a picture in accordance with the amount-of-code limit value arithmetic program shown in FIG. 8. However, the present invention is not limited thereto and the limit value $C_{max}$ for the amount of code to be generated can be obtained with other arithmetic programs.

Further, in the aforementioned embodiment, the coding control parts 703A to 703N of the respective coding devices 701A to 701N calculate an amount of code A, which can be transmitted within the set rate in surplus, in accordance with the amount-of-surplus-transmission-coding arithmetic program shown in FIG. 9. However, the present invention is not limited thereto and the amount of code A can be obtained with other arithmetic program.

Further, in the aforementioned embodiment, the multiplexing control part 709 of the multiplexer 705 obtains the maximum value $Z_{max}$ of the amount of code, which is distributed among the other coding devices 701A to b701N, in accordance with the congestion limit value arithmetic program shown in FIG. 10. However, the present invention is not limited thereto and the maximum value $Z_{max}$ of the amount of code, which is distributed among the other coding devices 701A to b701N, can be obtained with other arithmetic programs.

Furthermore, in the aforementioned first embodiment, the multiplexing control part 709 of the multiplexer 705 dynamically controls a bandwidth in such a manner that a surplus bandwidth out of a bandwidth assigned to each channel is distributed among other channels and the read rate of the coded data D711A to D711N from the buffer 704A to 704N of each channel is changed, from a write time of a picture (n) until a write time of a picture (n+1). However, the present invention is not limited thereto and the multiplexing control part 709 can always monitor an amount of data occupying each buffer 704A to 704N of the coding device 701A to 701N, so that a bandwidth assigned to the channel is distributed among other channels when any of buffers 704A to 704N is empty.

(3) Second Embodiment; Application to the Data Storing Device (3-1) Configuration of Transmission System Based on Second Embodiment FIG. 11 in which the same reference numerals are added to corresponding parts to FIG. 1 illustrates the configuration of a transmission system 1100 for a digital multichannel broadcasting based on this embodiment. A plurality of data storing devices 1101A to 1101N and coding devices 1111A to 1111N are provided therein.

Each data storing device 1101A to 1101N is composed of a data storing part 1107, a control part 1103, a format converting part 1102 and a buffer 1104. In the data storing part 1107, coded data D1120 generated by coding a video signal being a broadcasting material in optimum has been stored.

This coded data D1120 is read out from the data storing part 1107 at a specified timing under the control of the control part 1103. The read-out coded data D1120 is converted into a specified format in the format converting part 1102, and is stored in the buffer 1104 as coded data D1121 under the control of control part 1103 in a picture cycle and in a lump for each picture.

At this time, assuming that the time when the coded data D1121 of the picture (n) is written to the buffer 1104 is tp[n], the size of the buffer at the receiving side is B, and the highest rate of the coded data D1121 outputted from the format converting part 1102 (hereinafter, this is taken as the set rate for the data storing device 1101A to 1101M) is $R_0$ the control part 1103 executes the expression (12) based on a system time clock (STC) D1122 of 24-hour cycle supplied from the system time clock control part 1106 of the multiplexer 1105 via a first control bus 1120 to obtain the decoding time of the picture (n). While the control part 1103 replaces a decoding time stamp (DTS) [n] showing that time with a DST that has been previously added to the coded data D1121 of the picture (n), it replaces a program clock reference (PCR) added to the above coded data D1121 with a time obtained based on the STC D1122 at that time, and stores them in the buffer 1104 along with the coded data D1121.

Furthermore, the control part 1103 at this time executes an amount-of-surplus-transmission-code arithmetic program shown in FIG. 9 based on the amount of occupying data $C_0$ in the buffer 1104 that is immediately before writing the coded data D1121 of the picture (n), the set rate for the channel (the highest rate) $R_0$ and the amount of code C[n] of the picture (n) supplied from the format converting part 1102. Thus an amount of code A which can be transmitted in surplus within the range of the set rate $R_0$ is obtained and transmitted to the multiplexing control part 1109 of the multiplexer 1105 through the second control bus 1121 as information on amount-of-surplus-transmission-code D1123A to D1123N.

Besides, each coding device 1111A to 1111N is composed of a coding part 1112, a coding control part 1113 and a buffer 1114. The video signal S1111A to S1111N supplied thereto is inputted to the coding part 1112.

At this time, the coding control part 1113 executes an amount-of-code limit value arithmetic program shown in FIG. 8 based on the information on the amount of occupying data D1130 supplied from the buffer 1114, the amount of code in a picture up to the picture (n), and the set rate $R_0$ for the channel. Thus the limit value $C_{max}$ of the amount of code in a picture is obtained, and this is supplied to the coding part 1112 as a control signal S1130.

In this manner, the coding part 1112 performs compression coding on the inputted video signals S1111A to S1111N for the amount of code that does not exceed the limit value $C_{max}$ obtained based on the control signal S1130. Thus obtained coded data D1131 is stored in the buffer 1114 under the control of coding control part 1113 in a picture cycle and in a lump for one picture.

The coding control part 1113 at this time obtains a time to decode the picture (n) based on the expression (12) and the STC D1122 supplied from the system time clock control part 1106 of the multiplexer 1105 through the first control bus 1120. Then, while the coding control part 1113 replaces the decoding time stamp DTS [n] representing that time with a DST previously added to the coded data D1131 of the picture (n), it replaces the system time clock (STC) added to the coded data D1131 with a time obtained based on the STC D1122 at that time, and stores them in the buffer 1114 along with the coded data D1131.

Furthermore, the coding control part 1113 at this time executes an amount-of-surplus-transmission-code arithmetic program shown in FIG. 9 based on the amount of occupying data in the buffer 1114 immediately before writing the coded data D1131 of the picture (n), the set rate $R_0$ for the corresponding coding device 1111A to 1111N and the amount of code C[n] of that picture (n) supplied from the coding part 1112, to obtain the amount of code A that can be transmitted in surplus, and transmits this to the multiplexing control part 1109 of the multiplexer 1105 through the second control bus 1121 as the amount-of-surplus-transmission-code information D1133A to D1133N.

At the same time, the coding control part 1113 transmits information D1134A to D1134N such as the amount of occupying data $C_0$ in the buffer 1114 immediately before writing the coded data D1131 of the picture (n), the amount of code C[n] of the picture (n), and the set rate $R_0$ for that channel (hereinafter, this is referred to as information to calculate congestion limit value), which is necessary to obtain the maximum value $Z_{max}$ of a congestion limit, to the multiplexing control part 1109 of the multiplexer 1105 through the second control bus 1121.

The multiplexing control part 1109 recognizes that how much bandgap occurs in what data storing device 1101A to 1101N and/or coding device 111A to 1111N, based on the each of information on amount-of-surplus-transmission-code D1123A to D1123N and D1133A to D1133N which is supplied from the control part 1113 of each data storing device 1101A to 1101N and the coding control part 1113 of each coding device 1111A to 1111N. On the other hand, with respect to each coding device 1111A to 1111N which does not have bandgap, the multiplexing control part 1109 calculates the maximum value $Z_{max}$ of the amount of code to be distributed among the bandgap of the data storing devices 1101A to 1101N and/or the other coding devices 1111A to 1111N, based on the information to calculate congestion limit value D1134A to D1134N supplied from the corresponding coding control part 1113 according to the congestion limit value arithmetic program shown in FIG. 10.

Then, the multiplexing control part 1109 determines the amounts of code A1 to Am which are to be distributed from each channel which does not have bandgap (corresponding to channels in which the video signals S1111A to S1111N are subjected to real-time coding by the coding devices 1111A to 1111N) among other channels, and the amount of code Z1 to Zm which are to be distributed from other channels among channels which have bandgap (corresponding to channels from which stored data will be read out by the data storing devices 1101A to 1101N and channels in which the video signals S1111A to S1111N are subjected to real-time coding by the coding devices 1111A to 1111N), based on this obtained result so as to satisfy the expression (13). Thereafter, the multiplexing control part 1109 reads the coded data D1121 and D1131 in time division from the buffer 1104 of each data storing device 1101A to 1101N and the buffer 1114 of each coding device 1111A to 1111N, until the write time of the following picture n+1 based on the determined result: with respect to each channel which does not have bandgap, assuming that the set rate for the channel is $R_0$, a picture cycle is Tf, and the amount of code to be distributed to other channels is A1 to Am, at a rate of the expression (14), and with respect to each channel which has bandgap, assuming that the set rate for the channel is $R_0$, a picture cycle is Tf and the amount of code to be distributed from other channels is Z1 to Zm, at a rate of the expression (15).

This each of the coded data D1121 and D1131 read in time division is then transmitted to the transmitting part 108 through the data bus 1122, and subjected to a prescribed signal processing in the above transmitting part 108, and then the processed data is transmitted to the receiving side via an antenna 109 and a communication satellite not shown in figure as a transmission signal S1102.

In this manner, in this transmission system 1100, the video signals previously coded and the video signals S1111A to S1111N not coded can be efficiently multiplexed and transmitted to the receiving side.

(3-2) Operations and Effects of Second Embodiment

According to the above configuration, in this transmission system 1100, the coded data D1121 stored in the data storing part 1107 is read from each of the data storing devices 1101A to 1101N and stored in the buffer 1104, and the coded data D1131 obtained by real-time coding in each coding device 1111A to 1111N is stored in the buffer 1114. On the other hand, in each of the data storing devices 1101A to 1101N and each of the coding devices 1111A to 1111N, a bandgap for the set rate of the channel is obtained, the read rate of the coded data D1121, D1131 from the buffor 1104, 1114 of the channel which has bandgap (corresponding to the set rate for the channel) is lowered, and thus obtained surplus bandwidth is distributed among the read of the coded data D1121 and D1131 from the buffers 1104 and 1114 of other channels which do not have bandgap.

Therefore, in this transmission system 1100, even if a bandgap occurs in any channel, the channel can be effectively used without adding dummy data, different from the conventional fixed rate method, for example.

Moreover, in this transmission system 1100, since each picture can be decoded certainly at a specified decoding time without occurring overflow and underflow in the buffers at the receiving side only that each of the coding devices 1111A to 1111N keeps the limit of the amount of code in a picture, synchronization control among channels can be easily performed.

According to the above construction, since the multiplexer 1105 reads the coded data D1121 and D1131 from the buffer 1104 of each of the data storing devices 1101A to 1110N and the buffer 1114 of each of the coding devices 1111A to 1111N at a preset rate respectively, as well as dynamically detecting a bandgap unneeded by the data storing devices 1101A to 1101N and/or the coding devices 1111A to 1111N and distributing this among the coding devices 1111A to 1111N that has no capacity, the bandwidth of each channel can be dynamically controlled. Thus, a transmission system remarkably improved in the transmission efficiency can be realized.

(3-3) Other Embodiments

In the aforementioned second embodiment, the present invention is applied to the transmission system 1100 of the digital multichannel broadcasting. However, this invention is not only limited to this but also it can be widely applied to a coding and multiplexing apparatus used in other various systems.

In the aforementioned second embodiment, the coding control part 1113 of each of the coding devices 1111A to 1111N obtains the limit value $C_{max}$ of the amount of code to be generated in a picture based on the amount of code limit value arithmetic program shown in FIG. 8. However, the present invention is not only limited to this but also the limit value $C_{max}$ of the amount of code to be generated can be calculated with other arithmetic programs.

In the aforementioned second embodiment, the control part 1103 of each of the data storing devices 1101A to 1101N and the coding control part 1113 of each of the coding devices 1111A to 1111N obtain the amount of code A which can be transmitted in surplus at a set rate according to the amount-of-surplus-transmission-coding arithmetic program shown in FIG. 9. However, the present invention is not only limited to this but also the amount of code A which can be transmitted in surplus at the set rate can be obtained with other arithmetic programs.

In the aforementioned second embodiment, the multiplexing control part 1109 of the multiplexer 1105 obtains the maximum value $Z_{max}$ of the amount of code to be distributed among other coding devices 1111A to 1111N according to the congestion limit value arithmetic program shown in FIG. 10. However, the present invention is not only limited to this but also the maximum value $Z_{max}$ of the amount of code to be distributed among other coding devices 1111A to 1111N can be obtained with other arithmetic programs.

In the aforementioned second embodiment, the multiplexing control part 1109 of the multiplexer 1105 dynamically controls a read rate from the buffer 1104 and 1114 corresponding to each channel in which a surplus bandwidth of a band assigned to each channel is distributed among other channels during the time from the write time of the picture (n) to the write time of the following picture n+1. However, the present invention is not only limited to this but also, for example, the multiplexing control part 1109 of the multiplexer 1105 can sequentially monitor the amount of data occupying the buffer 1104 of each of the data storing devices 1101A to 1101N and the amount of data occupying the buffer 1114 of each of the coding devices 1111A to 1111N, and distribute a bandwidth (set rate) assigned to the corresponding data storing device 1101A to 1101N and coding device 1111A to 1111N among other coding devices 1111A to 1111N when the buffer 1104 or 1117 is empty.

Figure 11:
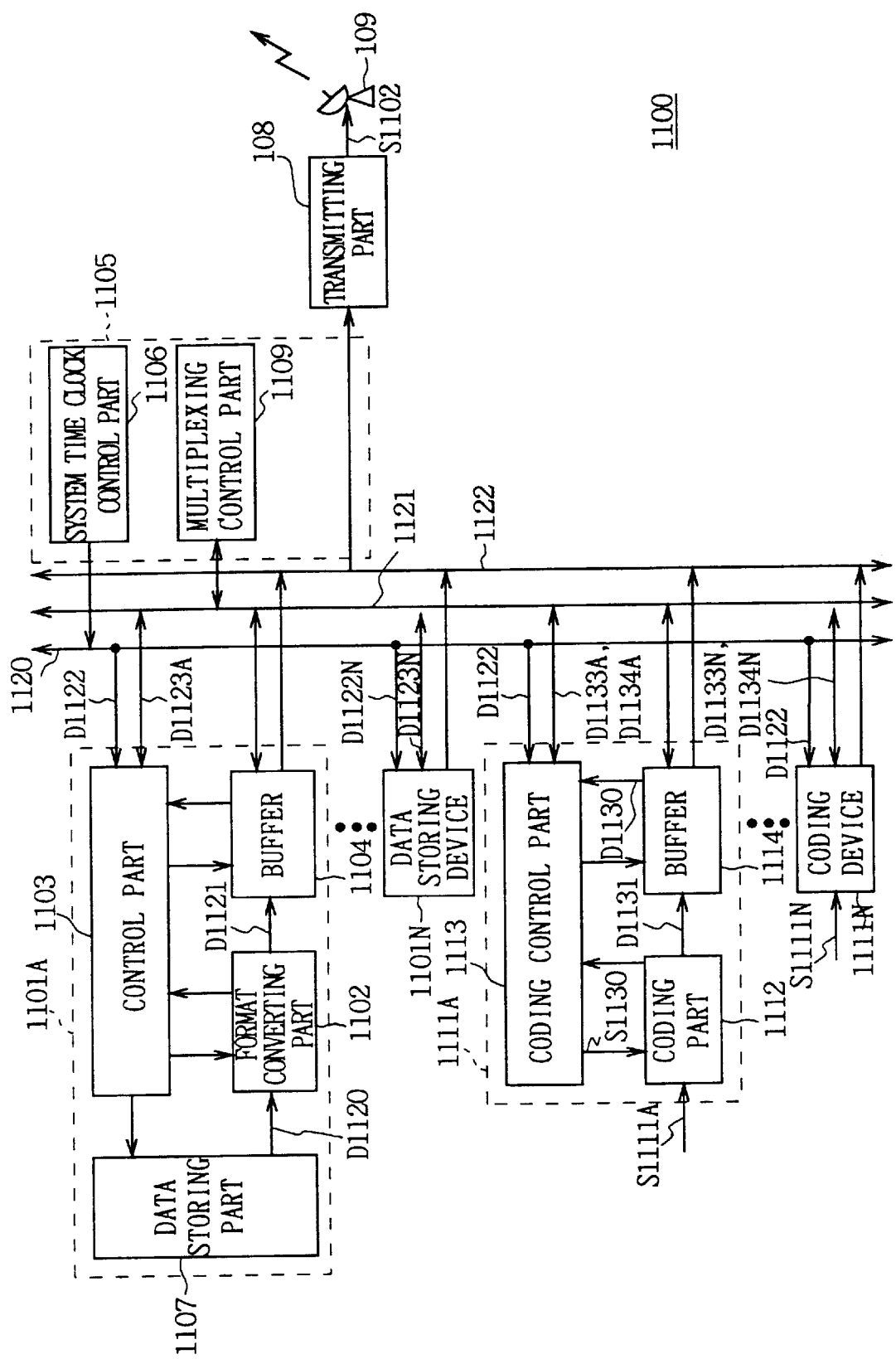
FIG. 11 is a block diagram showing the configuration of a transmission system according to the present invention.
Figure 12:
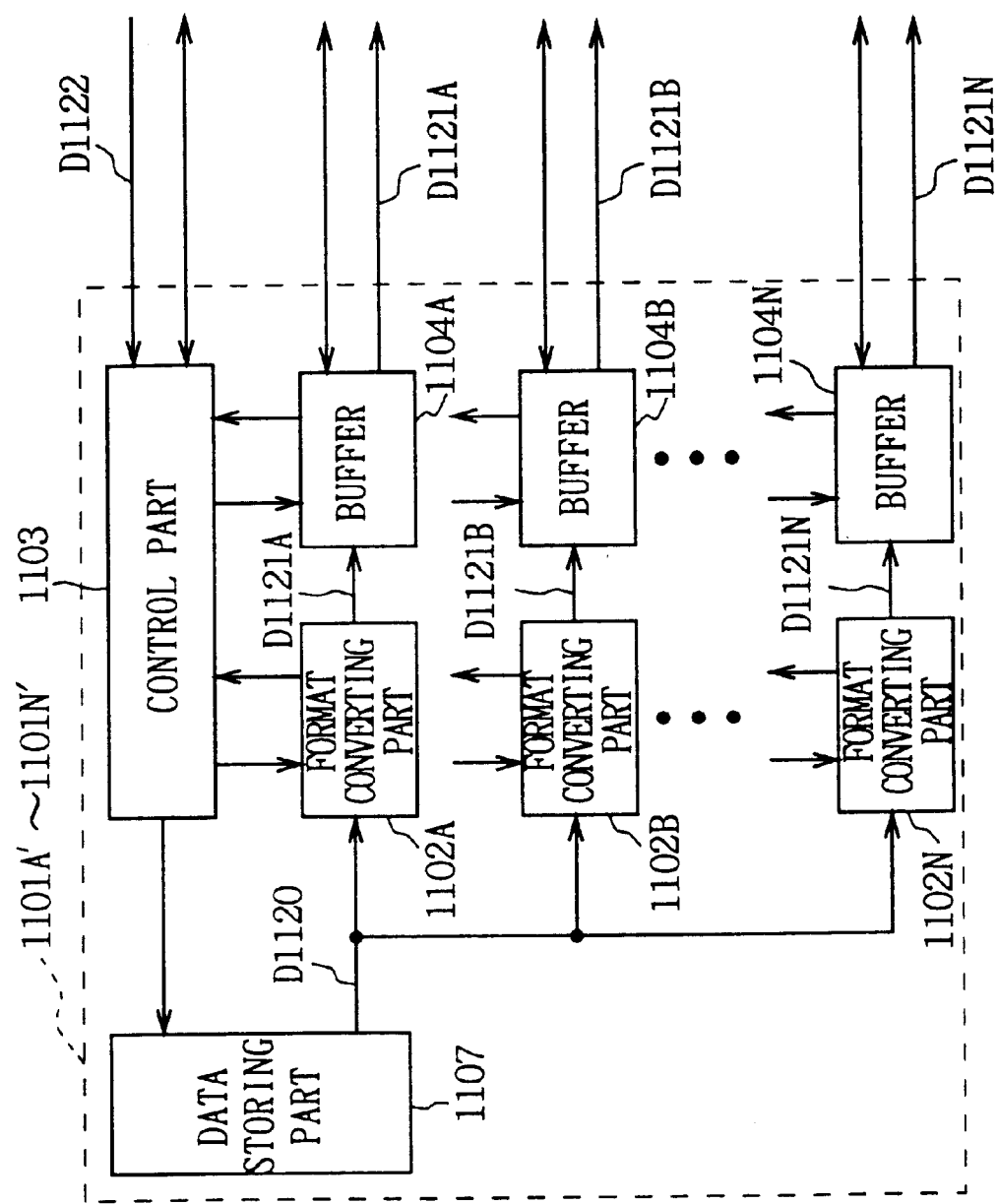
FIG. 12 is a block diagram explaining another embodiment.

Furthermore, in the aforementioned second embodiment, each of the data storing devices 1101A to 1101N is constructed as FIG. 11. However, the present invention is not only limited to this but also, for example, as shown in FIG. 12, one data storing part 1107 and one control part 1103 can be provided in one data storing device 1101A' to 1101N' as well as a plurality of format converting parts 1102A to 1102N and a plurality of buffers 1104A to 1104N to perform format conversion processing on the coded data D1120 stored in the data storing part 1107 at a different timing in each of the format converting parts 1102A to 1102N. Thereby, the present invention can be applied to a system for performing a near on demand service.

Figure 3:
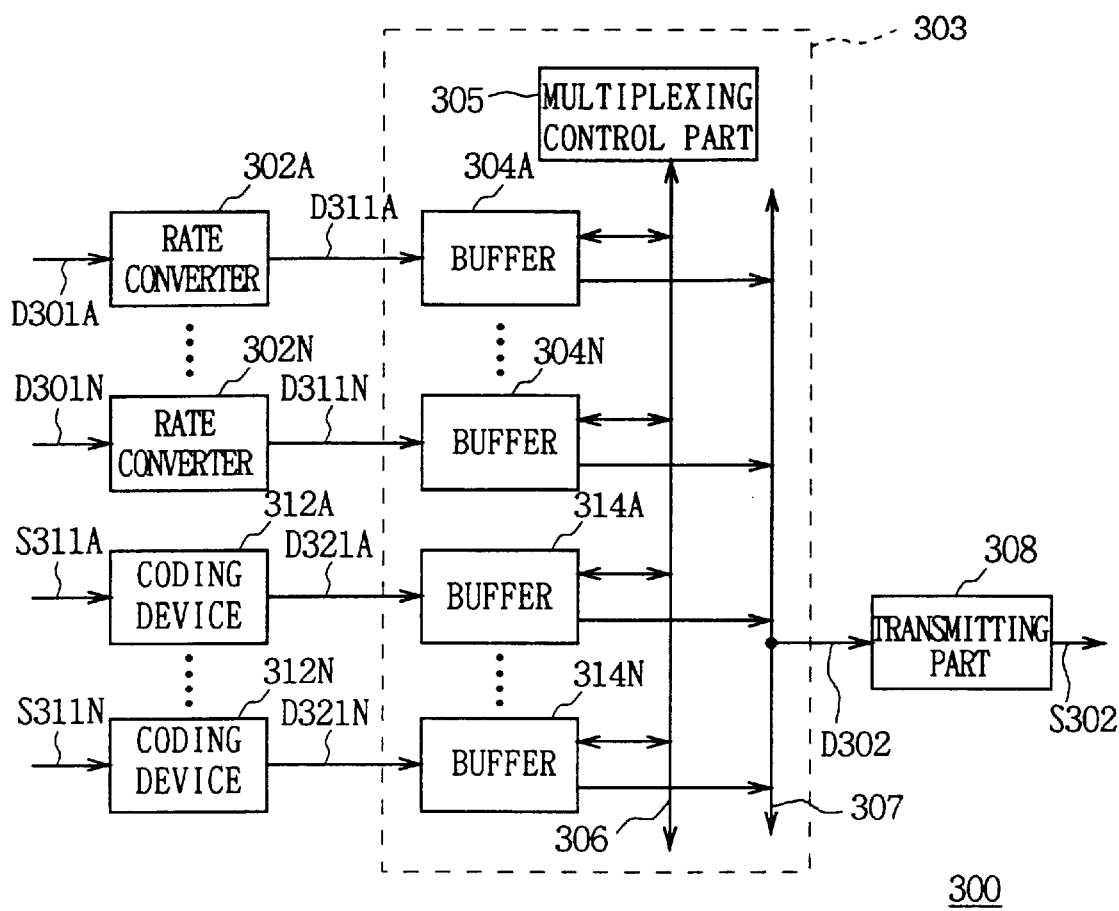
FIG. 3 is a block diagram showing the configuration of a conventional transmission system.
Figure 13:
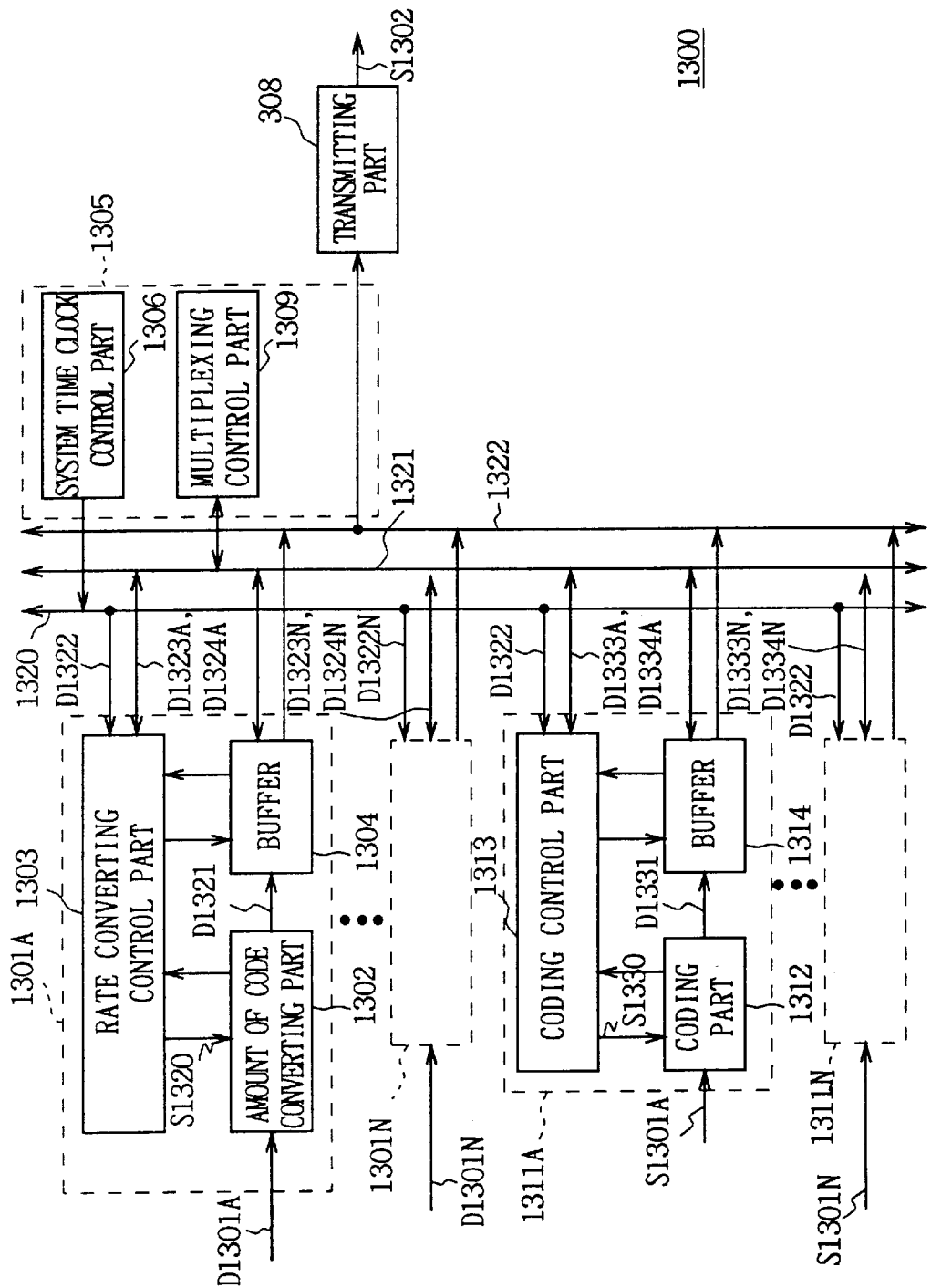
FIGS. 13 and 14 are block diagrams showing the transmission system according to the present invention.

(4) Third Embodiment: Application to Rate Converting Device (4-1) Configuration of Transmission System According to Third Embodiment FIG. 13 in which the same reference numerals are applied to parts corresponding to FIG. 3 shows a transmission system 1300 according to the present invention. A plurality of rate converters 1301A to 1301N and a plurality of coding devices 1311A to 1311N are provided therein. Coded data D1301A to D1301N are supplied to the rate converters 1301A to 1301N respectively, and video signals S1301A to S1301N are supplied to the coding devices 1311A to 1311N respectively.

Each rate converter 1301A to 1301N is composed of an amount-of-code converting part 1302, a rate converting control part 1303, and a buffer 1304. The coded data D1301A to D1301N to be supplied are input to the amount-of-code converting part 1302.

At this time, the rate converting control part 1303 executes the amount-of-code limit value arithmetic program shown in FIG. 8 by using the then amount of occupying data in the buffer 1304, the amount of code in a picture up to a picture (n) to be limited, the set rate $R_0$ previously assigned to the channel, and the like, in order to obtain the limit value $C_{max}$ of the amount of code per the picture, and supplies it to the amount-of-code converting part 1302 as a control signal 1320.

Therefore, the amount-of-code converting part 1302 converts the amount of code of the supplied coded data D1301A to S1301N to the amount of code which does not exceed the limit value $C_{max}$ which is obtained based on the control signal S1320. Then, the obtained coded data D1321 for one picture is stored in the buffer 1304 in a picture cycle all together under the control of rate converting control part 1303.

Further, at this time, the rate converting control part 1303 executes the expression (12) based on the system time clock (STC) information D1322 of 24 hours cycle, which is supplied from the system clock control part 1306 of a multiplexer 1305 via a first control bus 1320, assuming that the time of writing the coded data D1321 for the picture (n) is tp[n], the buffer size at a receiving side is B, and the set rate assigned to the channel is $R_0$, in order to obtain a time when the picture (n) have to be decoded. While the decoding time stamp (DTS) [n] representing the time is replaced with the DTS previously added to the coded data D1321 of the picture (n), the program clock reference (PCR) added to the coded data D1321 is replaced with the time, which is obtained based on the then system time clock information D1322, and they are stored in the buffer 1304 together with the coded data D1321.

Further, the rate converting control part 1303 executes the amount-of-surplus-transmission-coding arithmetic program shown in FIG. 9 based on the amount of occupying data in buffer 1304 just before writing the coded data D1321 for the picture (n), the amount of code of the picture C(n), and the set rate $R_0$ assigned to the channel, in order to obtain the amount of code A which can be transmitted within the set rate $R_0$ in surplus. The amount of code A is transmitted to the multiplexing control part 1309 of the multiplexer 1305 through a second control bus 1321 as an amount-of-surplus-transmission-coding information D1323A to D1323N.

Further, the rate converting control part 1303 transmits information (hereinafter, referred to as congestion limit calculation information) D1324A to D1324N such as the amount of occupying data in the buffer just before writing the picture (n), the amount of code C[n] of the picture (n), the set rate $R_0$ of the channel, which are required for obtaining the maximum of congestion limit $Z_{max}$, to the multiplexing control part 1309 of the multiplexer 1305 through the second bus 1321 together with the amount-of-surplus-transmission-coding information D1323A to D1323N.

On the other hand, each of the coding devices 1311A to 1311N is composed of a coding part 1312, a coding control part 1313, and a buffer 1314. Each of supplied video signals S1301A to 1301N is input to the coding part 1312.

At this time, the coding control part 1313, similarly to the rate converting control part 1303 of the rate converters 1301A to 1301N, executes the amount-of-code limit value arithmetic program shown in FIG. 8 based on the then amount of occupying data $C_0$ in the buffer 1314, the amount of code in a picture unit until the picture (n) to be limited, and the set rate $R_0$ assigned to the channel, in order to obtain the then amount of code limit value $C_{max}$ per a picture and transmit it to the coding part 1312 as a control signal S1330.

Thus, the coding part 1312 compression-codes the supplied video signal S1301A to S1301N so as not to exceed the limit value $C_{max}$ obtained based on the control signal S1330, and stores the obtained coded data D1331 for one picture in a picture cycle in the buffer 1314 all together under the control of coding control part 1313.

Further, at this time, the coding control part 1313 carries out the expression (12) based on the system time clock D1322, which supplied from the system time clock control part 1306 of the multiplexer 1305 through the first control bus 1320, in order to obtain a time when the picture (n) have to be decoded. Then, while the decoding time stamp (DTS) [n] representing the time is replaced with the DTS previously added to the coded data D1331 for the picture (n), the program clock reference added to the coded data D1331 is replaced with a time obtained based on the then system time clock, and they are stored in the buffer 1314 together with the coded data D1331.

Further, at this time, the coding control part 1313 executes the amount-of-surplus-transmission-code arithmetic program shown in FIG. 9 based on the amount of occupying data $C_0$ in the buffer 1314 just before writing the coded data D1331 for the picture (n), the amount of code C[n] of the picture (n), the set rate $R_0$ assigned to the channel, in order to the amount of code A which can be transmitted within the set rate $R_0$ in surplus. Then the amount of code A is transmitted to the multiplexing control part 1309 of the multiplexer 1305 through the second control bus 1321 as the amount of surplus transmission code information D1333A to D1333N.

Further, the coding control part 1313 transmits the congestion limit value calculating information D1334A to D1334N comprising various information required for obtaining the maximum of congestion limit $Z_{max}$ to the multiplexing control part 1309 of the multiplexer 1305 through the second control bus 1321 together with the amount-of-surplus-transmission-code information.

The multiplexing control part 1309 recognizes how much the bandgap exist in which channel, based on the amount-of-surplus-transmission-code information D1323A to D1323N and D1333A to D1333N respectively supplied from the rate converting control parts 1303 of the rate converters 1301A to 1301N and the coding control parts 1313 of the coding devices 1311A to 1311N. On the other hand, as to each channel which does not have a bandgap, the multiplexing control part 1309 obtains the maximum $Z_{max}$ of the amount of code to be distributed among bandgaps of other channels in accordance with the congestion limit value arithmetic program shown in FIG. 10 based on the congestion limit calculating information D1324A to D1324N and D134A to D1334N respectively supplied from the rate converting control parts 1303 of the rate converters 1301A to 1301N and the coding control parts 1313 of the coding devices 1311A to 1311N.

Then the multiplexing control part 1309 decides the amount of code A1 to Am to be distributed among other channels from a channel which does not have a bandgap and the amount of code Z1 to Zm to be distributed among channels which have a bandgap from other channels so as to satisfy the expression (13). Then, until a time of writing the following picture (n) to the buffer, the coded data D1321 and D1331 are read out in time division from the buffers 1304 of the rate converting devices 1301A to 1301N and the buffers 1314 of the coding devices 1311A to 1311N: as for channels which do not have a bandgap, at a rate of the expression (14) assuming that the set rate of the channel $R_0$ and the picture cycle is Tf, and as for channels which have a bandgap, at a rate of the expression (15) assuming that the set rate of the channel is $R_0$ and the picture cycle is Tf.

Then the coded data D1321 and D1331 read out in time division are transmitted to the transmitting part 308 through the data bus 1322 to be subjected to a predetermined signal processing, and then-transmitted to a receiving side as a transmission signal S1302.

In this way, the transmission system 1300 can broadcast by multiplexing coded data D1301A to D1301N for a plurality of channels which are supplied from other stations and coded data D3A to D3N for a plurality of channels generated by coding the video signals S1301A to S1301N of a local station in real time.

(4-2) Operation and Effect of Third Embodiment

In the aforementioned configuration, in the transmission system 1300, each rate converter 1301A to 1301N converts the rate of the inputted coded data D1301A to D1301N to the rate set for the channel, and each coding device 1311A to 1311N compression-codes the inputted video signal S1301A to S1301N. On the other hand, each of the rate converters 1301A to 1301N and the coding devices 1311A to 1311N obtains a gandgap for the set rate of the channel, and then based on the obtained result, lowers the read rate (corresponding to the set rate of the channel) for the coded data D1321, D1331 from the buffer 1304, 1314 for the channel which has a bandgap, in order to distribute the surplus rate among the, read of the coded data D1321, D1331 from the buffers 1304, 1314 of other channels which do not have a bandgap.

Therefore, the transmission system 1300 can effectively use the bandgap without adding dummy data even if a bandgap occurs in any of channels.

Further, the transmission system 1300 can surely decode a picture at a designated decoding time with preventing the buffers in the receiving side from overflow and underflow, only the rate converters 1301A to 1301N and the coding devices 1311A to 1311N keep the limit of the amount of code per a picture. The simultaneous control can be surely performed between channels.

According to the aforementioned configuration, the multiplexer 1305 dynamically detects a bandgap which is not required for each channel in the set rate preset for the channel, to distribute it among channels which need the bandwidth, and thereby a band of each channel can be dynamically controlled. Thus, it is possible to realize a transmission system capable of remarkably improving the transmission efficiency.

(4-3) Other Embodiments

Note that, in the third embodiment, the multiplexing control part 1309 of the multiplexer 1305 converts the read rate of the buffer 1304 and 1314 corresponding each channel so as to distribute a surplus bandwidth of a bandwidth assigned to the channel, among other channels from a time of writing a picture (n) to a time of writing a picture (n+1). However, the present invention is not limited thereto and the multiplexing control part 1309 can always monitor an amount of occupying data in the buffers 1304 and 1314, and can distributes a bandwidth assigned to the channel when any of buffers 1304 and 1314 is empty.

Further, in the third embodiment, the plurality of rate converters 1301A to 1301N (the code converting part 1302) for converting the rates for the coded data D1301A to D1301N to be inputted are provided as rate converting means, and the plurality of coding devices 1311A to 1311N (the coding part 1312) are provided as coding means for compression-coding the inputted video signals S1A to S1N. However, the present invention is not limited thereto and one each in both of them or in one of them can be provided.

Figure 4:
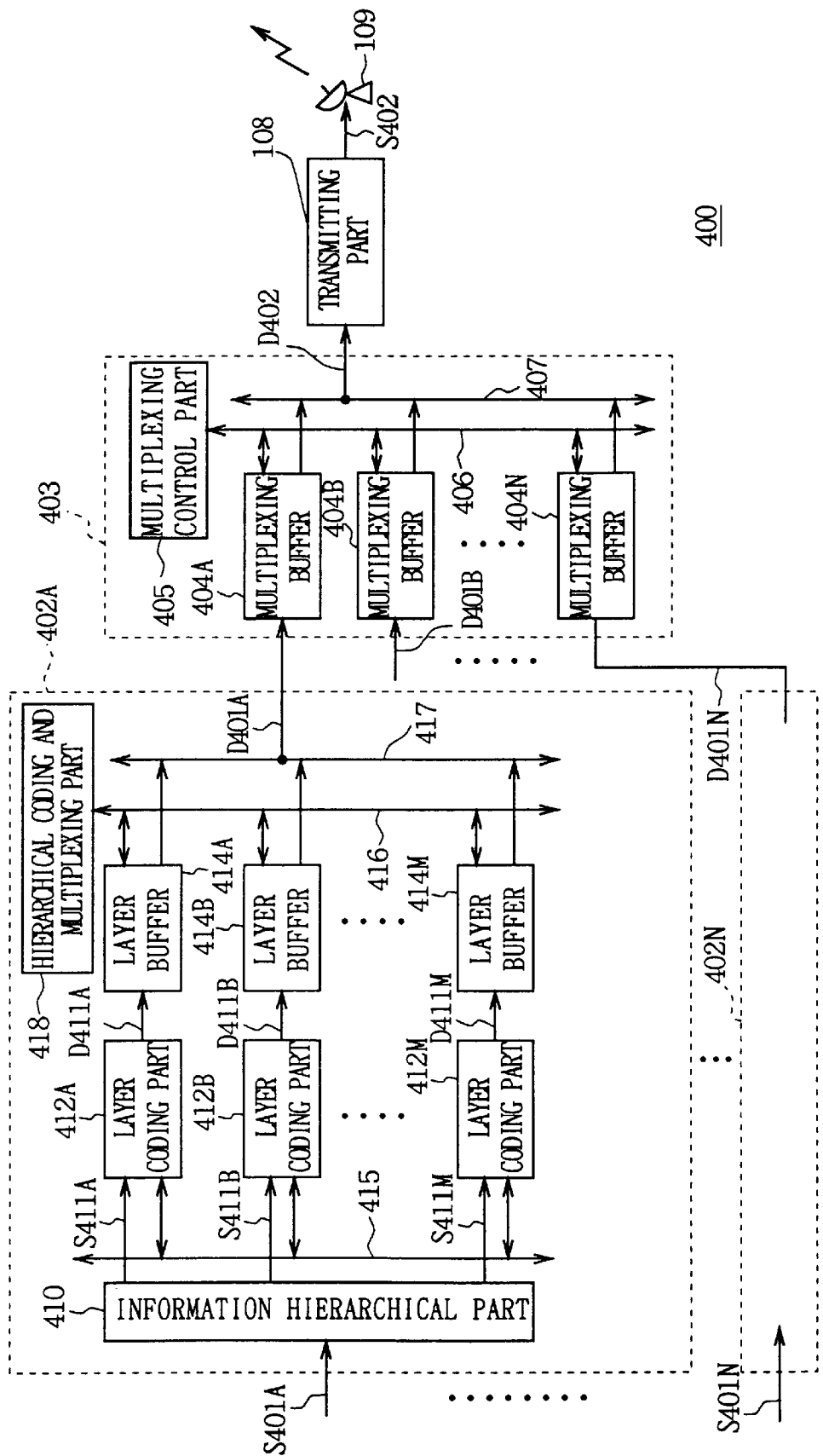
FIG. 4 is a block diagram showing the configuration of a transmission system in a conventional fixed rate method.
Figure 14:
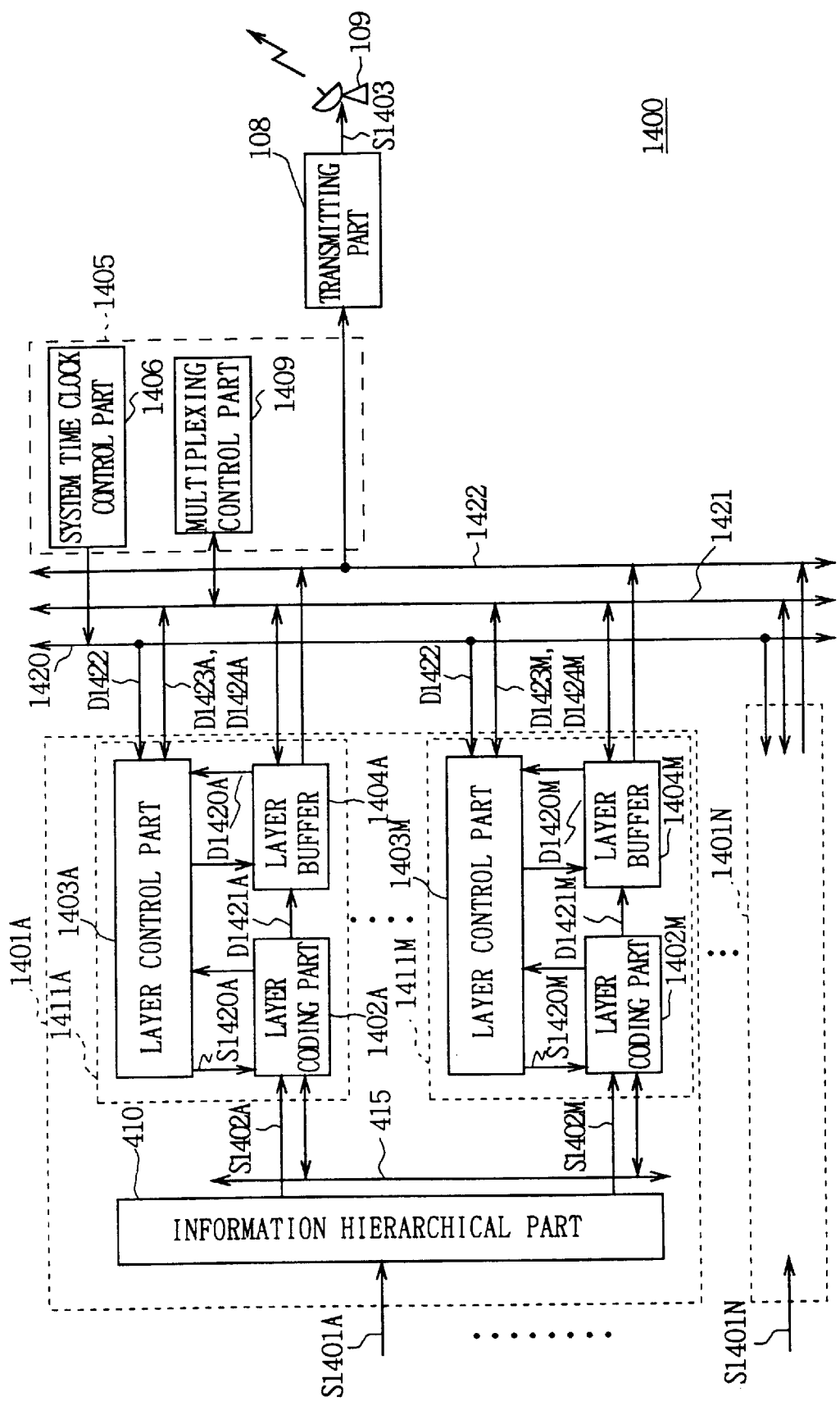

(5) Fourth Embodiment: Application to Hierarchical Coding Device (5-1) Configuration of Transmission System According to Fourth Embodiment FIG. 14 in which the same reference numerals are provided the corresponding parts as in FIG. 4, illustrates the configuration of a transmission system 1400 of digital multichannel broadcasting system according to this embodiment. A plurality of hierarchy coding devices 1401A to 1401N are provided in an input stage and these hierarchy coding devices 1401A to 1401N are respectively provided video signal S1401A to S1401N of HDTV method.

The hierarchy coding devices 1401A to 14011 have information hierarchical part 410 and coding devices 1411A to 1411M. The information hierarchical part 410 executes filtering and sub-sampling on the supplied video signal S1401A to S1401N, in order to hierarchically generate a plurality of images, of which resolution are different each other. Then, the information hierarchical part 410 supplies the resultant as layer video signals S1402A to S1402M respectively to the corresponding layer coding parts 1402A to 1402M in the order of lower frequency component (that is, in the order of pictures having rougher resolution).

In this connection, if pictures are successively transmitted in the order of images of rougher resolution to finer resolution, after being hierarchically divided, it is very convenient when an immediate reference of pictures is required, because in the receiving side, an outline of images are conceived at an earlier stage of transmission. Also, in compliance with the error characteristics of transmission lines and receiving condition, the receiving side can receive selectively hierarchically-divided pictures. As a result, video signal of HDTV method and video signal of standard definition television (SDTV) method, for example, can be selected according to receiving quality based on the capacity of receiving side.

These coding devices 1411A to 1411M comprises layer coding parts 1402A to 1402M, layer control parts 1403A to 1403M and layer buffer 1404A to 1404M, and inputs supplied layer video signals S1402A to S1402M respectively to the layer coding parts 1402A to 1402M.

Since correlation is present between pictures of different resolution, every layer coding part 1403A to 1403M takes disparity between layer video signals S1402A to S1402M through a data bus 415 each other. Thus, the layer coding part 1402A is provided layer video signal S1402A having the lowest rank frequency component, which is acquired by down-sampling the video signal S1401A. The following higher rank layer coding part 1402B is provided only a remaining component of layer S1402B, which is acquired by eliminating the frequency component of layer video signal S1402A from layer video signal S1402B. In the same way, as applied layer becomes higher rank, the layer coding parts 1402C to 1402M are successively provided remaining component of frequency component between the following lower rank layers.

At this time, the layer control parts 1403A to 1403M execute the amount of code limit value arithmetic program shown in FIG. 8, based on the amount of occupying data information D1420A to D1420M given from the layer buffers 1404A to 1404M, the amount of code in picture unit up to the picture (n), and the set rate of coding device 1411A to 1411M and so on. Thus, the layer control parts 1403A to 1403M calculates the limit value $C_{max}$ of the amount of code in a picture unit, and give the resultant as control signals S1420A to S1420M to layer coding part 1402A to 1402M respectively.

Therefore, the layer coding parts 1402A to 1402M compression-code the remaining component of inputted video signal S1402A to S1402M, which is acquired by subtracting the correlation component by each layer, at the amount of code under the limit value of $C_{max}$, which is acquired based on the control signals S1420A to S1420M. Then, the acquired layer coding data D1421A to D1421M are stored in layer buffers 1404A to 1404M under the control of layer control parts 1403A to 1403M in a picture cycle and also one picture in one lot.

At the same time, the layer control part 1403A calculates the time for decoding the picture (n), based on the system time clock (STC) information D1422 of 24-hour cycle, which is provided from system time clock control part 1406 in the multiplexer 1405 via a first control bus 1420, in accordance with the expression (12), assuming that the time for writing layer coding data D1421A to D1402M in layer buffers 1404A to 1404M is tp[n], the buffer size of receiving side is B, and the set rate of coding devices 1411A to 1411M in the receiving side is $R_0$. Then, the layer control part 1403A replaces decoding time stamp (DTS) information [n] indicating the time for decoding with a DST previously added to the layer coded data D1421A to D1421M beforehand, while replacing program clock reference (PCR) added to the layer coded data D1421A to 1421M with the time obtained based on the present system time clock information D1422. The layer control part 1403A stores them in the layer buffers 1401A to 1401M together with the layer coded data D1421A to D1421M.

Further, the layer control part 1403A to 1403M carries out the amount-of-surplus-transmission-coding arithmetic program shown in FIG. 9 based on the amount of occupying data in the layer buffers 1404A to 1404M just before writing the layer coded data D1421A to D1421M for the picture (n), the amount of code of the picture (n), the set rate, and the amount of code of the picture (n) supplied from the layer coding part 1402A to 1402M, in order to obtain the amount of code A which can be transmitted in surplus. Then, the amount of code A is transmitted to the multiplexing control part 1409 of the multiplexer 1405 through the second control bus 1421 as the amount-of-surplus-transmission-code information D1423A to D1423M.

Further, the layer control parts 1403A to 1430M transmit information required for obtaining the maximum $X_{max}$ of congestion limit.(for example, the amount of occupying data in the layer buffers 1404A to 1404M just before writing the picture (n), the amount of code of the picture (n), the set rate, the picture cycle, the number of latest picture which is not decoded yet, and the like) to the multiplexing control part 1409 of the multiplexer 1405 through the second control bus 1421 as the congestion limit value calculating information D1424A to D1424M.

The multiplexing control part 1409 recognizes how much the bandgap occur in what coding devices 1411A to 1411M, based on the amount-of-surplus-transmission-code information D1423A to D1423M supplied from the layer control part 1403A to 1403M of the coding device 1411A to 1411M and on the other hand, as to the coding devices 1411A to 1411M which do not have a bandgap, calculates the maximum $C_{max}$ of the amount of code to be distributed among handgaps of the other coding devices 1411A to 1411M based on the congestion limit value calculating information D1424A to D1424M supplied from the corresponding layer control parts 1403A to 1403M in accordance with the congestion limit value arithmetic program shown in FIG. 10.

Then, the multiplexing control part 1409 sets the amount of code Z1 to Zm to be distributed among other coding devices 1411A to 1411M from a coding device 1411A to 1411M which does not have a bandgap and the amount of code A1 to Am to be distributed among coding devices 1411A to 1411M which have a bandgap, based on the calculation result, so as to satisfy the expression (13). Then, based on the set result, the multiplexing control part 1409 reads the layer coded data D1421A to D1421M from the layer buffers 1404A to 1404M of the coding devices 1411A to 1411M in time division until a time of writing the following picture (n+1) in the layer buffers 1404A to 1404M: as for a layer which does not have a bandgap, at a rate of the expression (14), assuming that the set rate of the layer is $R_0$ and the picture cycle is Tf; and as for a layer which has a bandgap, at a rate of the expression (15), assuming that the set rate $R_0$ of the layer and the picture cycle is Tf.

Then, the layer coded data D1421A to 1421M read out in time division are transmitted to the transmitting part 108 through the data bus 1422 to be subjected to a predetermined signal processing, and transmitted to a receiving side through an antenna and a communication satellite not shown as a transmission signal S1403.

In this way, the transmission system 1400 can transmit the video signals S1401A to S1401M for a plurality of channels to a receiving side after coding and multiplexing them.

(5-2) Operation and Effect of Fourth Embodiment

In the aforementioned configuration, in the transmission system 1400, each hierarchical coding device 1401A to 1401N sequentially divides a band of the frequency of the inputted video signal S1401A to S1401N in order to obtain a plurality of layer video signal S1402A to S1402M which has hierarchically difference resolutions with keeping the correlation, and then supplies them to the corresponding coding devices 1411A to 1411M provided therein.

The coding devices 1411A to 1411M code the remaining component, which is obtained by eliminating the correlation component by each layer in the inputted layer video signal S1402A to S1402M, and also obtain the amount of code A which can be transmitted in surplus. On the other hand, based on the obtained result and the congestion limit value calculating information D1424A to D1424M outputted from the coding devices 1411A to 1411M, the multiplexing control part 1409 of the multiplexer 1405 decides the amount of code Z1 to Zm to be distributed from coding devices 1411A to 1411M which do not have a bandgap among other coding devices 1411A to 1411M and the amount of code A1 to Am to be distributed among the coding devices 1411A to 1411M which have a bandgap. Then, the multiplexing control part 1409 reads the layer coded data D1421A to D1421M from the layer buffers 1404A to 1404M of the coding devices 1411A to 1411M in time division at a rate based on the decision result until a time of writing the following picture (n+1) in the layer buffers 1404A to 1404M.

Therefore, the transmission system 1400 can remarkably improve the transmission efficiency because a bandgap can be effectively used without adding dummy data in the case where a bandgap occurs, different from the conventional fixed rate method.

Further, the transmission system 1400 can surely decode each picture at a designated decoding time with prevent the buffers at a receiving side from overflow and underflow, only the coding devices 1411A to 1411M provided in the hierarchical coding devices 1401A to 1401N keep the limit of the amount of code per a picture. Thus, the simultaneous control can be easily performed between layers.

According to the aforementioned configuration, while a band preset by the multiplexer 1405 is assigned to the coding devices 1411A to 1411M provided in the hierarchical coding devices 1401A to 1404N, a gap of a band not required by the coding devices 1411A to 1411M is dynamically detected to be distributed among coding devices 1411A to 1411M which need a bandwidth. Therefore, the band of each layer can be dynamically controlled and thus, the transmission system capable of remarkably improving the transmission efficiency can be realized.

(5-3) Other Embodiments

Note that, in the aforementioned fourth embodiment, the multiplexing control part 1409 of the multiplexer 1405 distributes a surplus bandwidth of the bandwidth assigned to each layer among other layers to convert the read rate from the layer buffer 1404A to 1404M corresponding to each layer, from a time of writing a picture (n) until a time of writing a picture (n+1). However, the present invention is not limited thereto and the multiplexing control part 1409 can always monitor the amount of data occupying each layer buffer 1404A to 1404M to distribute a bandwidth assigned to the layer among other layers when any of layer buffer is empty.

Further, in the aforementioned fourth embodiment, the information hierarchical part 410 is applied for performing hierarchical processing in a space scalable method, as hierarchical means for converting the video signal S1401A (S1401B to S1401N) to a plurality of layer video signals having hierarchically different resolution. However, the present invention is not limited thereto and can use an object oriented coding method which may be used in the MPEG4 standard. The object oriented coding method is a method of performing coding so that a background picture is eliminated and that a picture of people has a high picture quality in the case of a picture composed of the people and background. Thus, hierarchical coding is achieved in the contents of a picture.

(6) Effect

According to the present invention as described above, the coding and multiplexing apparatus for coding video signals for a plurality of channels with different coding means and multiplexing obtained coded data for each channel, comprises buffers provided corresponding to respective coding means for storing coded data outputted from corresponding coding means, and multiplexing means for reading out coded data, which are stored in the buffers, in time division at a proper set rate preset for corresponding coding means and multiplexing coded data for each channel. The multiplexing means distributes a surplus bandwidth of the set rate of the coding means among the read of coded data from buffers corresponding to other coding means in accordance with the amount of coded data outputted from the coding means. Therefore, the band width can be dynamically controlled every channel and thus, the coding and multiplexing apparatus capable of significantly improving the transmission efficiency can be realized.

Further, according to the present invention, the coding and multiplexing method of compression-coding and multiplexing the video signals for a plurality of channels comprises the first step of compression-coding the video signals and storing the obtained coded data in different buffers and the second step of reading the coded data, which are stored in the buffers, in time division at a proper set rate preset for each channel. In the second step, a surplus bandwidth for the set rate of the channel is distributed among the read of coded data from the buffers of other channels in accordance with the amount of coded data for each channel and thereby, the band can be dynamically controlled every channel. Thus the coding and multiplexing method capable of remarkably improving the transmission efficiency.

According to the present invention as described above, the coding and multiplexing apparatus comprises a plurality of the first buffers for respectively storing the first coded data read from storage means, a plurality of the second buffers for respectively storing the second coded data obtained by compression-coding video signals outputted from corresponding coding means, and multiplexing means for reading the first and the second coded data, which are respectively stored in the first and the second buffers, in time division at a proper rate preset for the corresponding storage means or coding means and multiplexing each of the first and the second coded data. And the multiplexing means distributes a surplus bandwidth for the set rate of the storage means and the coding means among the read of the second coded data from the second buffers corresponding to other coding means. Thereby, a bandwidth for each cannel can be controlled dynamically, and thus a coding and multiplexing apparatus remarkably improved in the transmission efficiency can be realized.

Moreover, according to the present invention, the coding and multiplexing method comprises the first step of respectively reading the first coded data for one or a plurality of channels that has been previously subjected to compression coding and stored and storing it in the different first buffers, as well as performing compression coding on an inputted video signals for one or a plurality of channels and storing the second coded data obtained in the different second buffers, and the second step of reading the first and the second coded data, which are stored in the first and the second buffers respectively, in time division at a peculiar rate preset for each channel and multiplexing each of the first and the second coded data. And in the second step, a surplus bandwidth for the set rate of each channel is distributed among the read of the second coded data from the second buffers of the other channels. Thereby, a bandwidth for each channel can be dynamically controlled, and thus the coding and multiplexing method remarkably improved in the transmission efficiency can be realized.

Further, according to the present invention, the coding and multiplexing apparatus comprises the first buffers for storing first coded data of which the rate has been converted and which is outputted from the corresponding rate converting means, the second buffers for storing second coded data generated by compression-coding video signals outputted from the corresponding coding means, and a multiplexing means for reading first or second coded data, which is stored in the first or second buffer, at a proper set rate preset for the corresponding rate converting mans or coding means and multiplexing the first or second coded data. The multiplexing means distributes a surplus bandwidth for the set rate of the rate converting means and/or coding means among the read of the first and/or second coded data from the first and/or second buffer corresponding to other rate converting means and/or coding means. Thereby, a bandwidth can be dynamically controlled every channel and thus, the coding and multiplexing apparatus capable of remarkably improving transmission efficiency can be realized.

Further, according to the present invention, in the coding and multiplexing method comprises the first step of converting a rate and storing inputted coded data for one or a plurality of channels in different first buffers and of compression-coding video signals for one or a plurality of channels and storing them in different second buffers and the second step of reading out and multiplexing the first and second coded data, which are stored in the first and second buffers respectively, at a proper rate preset for each channel. The second step distributes a surplus bandwidth for the set rate of each channel among the read of the first and/or second coded data from the first and/or second buffer corresponding to other channels and thereby, a bandwidth for each channel can be dynamically controlled. Thus, the coding and multiplexing method capable of remarkably improving transmission efficiency can be realized.

Further, in the present invention, the coding and multiplexing apparatus having the hierarchical means comprises the buffers corresponding to coding means for storing coded data outputted from corresponding coding means and multiplexing means for reading coded data, which are stored in the buffers, in time division at a proper set rate preset for the corresponding coding means and multiplexing the coded data. The multiplexing means distributes a surplus bandwidth for the set rate of the coding means among the read of coded data from the buffers corresponding to the coding means. Thereby, a bandwidth for each layer can be dynamically controlled and thus, the coding and multiplexing apparatus capable of remarkably improving transmission efficiency can be realized.

Furthermore, according to the present invention, the coding and multiplexing means for performing the hierarchical processing comprises the first step of storing coded data for each layer in a buffer, and the second step of reading coded data, which are stored in the buffers, in time division at a proper set rate preset for each layer and multiplexing the coded data. The second step distributes a surplus bandwidth for the set rate of the layer among the read of coded data from buffers corresponding to other layers. Therefore, a bandwidth for each layer can be dynamically controlled and thus, the coding and multiplexing method capable of significantly improving transmission efficiency can be realized.

While there has been described in connection with the preferred embodiments of the invention, it will be obvious to those skilled in the art that various changes and modifications may be claimed, therefore, to cover in the appended claims all such changes and modifications as fall within the true spirit and scope of the invention.

What is claimed is:

1. A coding and multiplexing apparatus, comprising:
   at least one storage means for storing respective first coded data previously subjected to compression coding;
   at least one read means corresponding to said at least one storage means for reading out the first coded data from said corresponding storage means;
   at least one first buffer corresponding to said at least one read means for storing the first coded data read from said corresponding storage means;
   at least one coding means for performing compression coding on a respective input video signal for providing respective second coded data;
   at least one second buffer corresponding to said at least one coding means, for storing the second coded data; and
   multiplexing means for reading out the first coded data from said at least one first buffer and the second coded data from said at least one second buffer in a time division manner such that at least one of the first and second coded data are read out from the respective buffer at a peculiar set rate preset for said respective corresponding storage means or coding means; and
   wherein said multiplexing means distributes a surplus bandwidth associated with the set rate by varying a rate for reading out the other of the first and second coded data from the respective buffer.

2. The coding and multiplexing apparatus according to claim 1, wherein
   said multiplexing means limits an amount of said first coded data and second coded data to be read from respective buffers so as to prevent buffers at a decoding side from overflowing.

3. The coding and multiplexing apparatus according to claim 1, wherein
   said at least one coding means codes the respective input video signal to limit an amount of code in a picture so as to prevent a buffer at a decoding side from underflowing.

4. A coding and multiplexing apparatus, comprising:
   a storage means for storing a plurality of first coded data previously subjected to compression coding, the storage means including:
   a plurality of read means, each read means for reading out a respective one of the plurality of first coded data; and
   a plurality of first buffers, each first buffer corresponding to one of said read means, for storing the first coded data read from said storage means;
   a plurality of coding means, each coding means for performing compression coding on a respective input video signal for providing respective second coded data;
   a plurality of second buffers, each second buffer corresponding to one of said coding means, for storing the second coded data; and
   multiplexing means for reading out the first coded data from one of said first buffers and the second coded data from one of said second buffers in a time division manner such that at least one of the coded data are read out from a respective buffer at a peculiar set rate preset for said corresponding storage means and coding means and other of the coded data are read out from respective buffers by varying a rate for reading so as to distribute a surplus bandwidth associated with the set rate.

5. A coding and multiplexing method, comprising:
   reading first coded data for at least one channel that has been previously subjected to compression coding;
   storing the first coded data in at least one first buffer;
   performing compression coding on at least one input video signal for providing second coded data;
   storing the second coded data in at least one second buffer;
   reading the first coded data and the second coded data, which are stored in the first and second buffers, respectively, in a time division manner such that at least one of the coded data are read out from a respective one of the buffers at a proper set rate preset for the respective one of the buffers; and
   distributing a surplus bandwidth associated with the set rate by varying a rate for reading the other of the coded data from another one of the buffers.

6. The coding and multiplexing method according to claim 5, wherein
   each reading step limits an amount of said first coded data and second coded data to be read from respective buffers so as to prevent buffers at a decoding side from overflowing.

7. The method of coding and multiplexing according to claim 5, wherein
   said compression coding step codes the respective input video signal to limit an amount of code in a picture so as to prevent a buffer at a decoding side from underflowing.

* * * * *